US010422681B2

(12) United States Patent
Rondano et al.

(10) Patent No.: US 10,422,681 B2
(45) Date of Patent: Sep. 24, 2019

(54) SENSOR FOR DETECTING THE LEVEL OF A MEDIUM

(71) Applicant: ELTEK S.p.A., Casale Monferrato (Alessandria) (IT)

(72) Inventors: Matteo Rondano, Casale Monferrato (IT); Enrico Chiesa, Casale Monferrato (IT); Mauro Zorzetto, Casale Monferrato (IT); Domenico Cantarelli, Casale Monferrato (IT)

(73) Assignee: ELTEK S.P.A., Casale Monferrato (Alessandria) (IT)

( * ) Notice: Subject to any disclaimer, the term of this patent is extended or adjusted under 35 U.S.C. 154(b) by 265 days.

(21) Appl. No.: 15/315,225

(22) PCT Filed: May 28, 2015

(86) PCT No.: PCT/IB2015/054020

§ 371 (c)(1),
(2) Date: Nov. 30, 2016

(87) PCT Pub. No.: WO2015/181770

PCT Pub. Date: Dec. 3, 2015

(65) Prior Publication Data

US 2017/0191861 A1 Jul. 6, 2017

(30) Foreign Application Priority Data

May 30, 2014 (IT) .............................. TO2014A0439

(51) Int. Cl.
*G01F 23/26* (2006.01)

(52) U.S. Cl.
CPC ............ *G01F 23/265* (2013.01); *G01F 23/26* (2013.01); *G01F 23/263* (2013.01); *G01F 23/266* (2013.01); *G01F 23/268* (2013.01)

(58) Field of Classification Search
CPC ...... G01F 23/265; G01F 23/26; G01F 23/263; G01F 23/266; G01F 23/268
See application file for complete search history.

(56) References Cited

U.S. PATENT DOCUMENTS 8,558,361 B2 10/2013 Kawaguchi
2005/0280424 A1* 12/2005 Qu ........................ G01F 23/265 324/663

(Continued)

FOREIGN PATENT DOCUMENTS

WO WO 2010/139974 12/2010

OTHER PUBLICATIONS

International Search Report and Written Opinion of the ISA for PCT/IB2015/054020, dated Dec. 18, 2015, 16 pages.

(Continued)

*Primary Examiner* — Eric S. McCall
*Assistant Examiner* — Timothy P Graves
(74) *Attorney, Agent, or Firm* — Nixon & Vanderhye PC

(57) ABSTRACT

A level sensor for detecting the level of a medium contained in a vessel comprises:

an array of capacitive elements designed to be associated with the vessel (1), comprising a plurality of electrodes ($J_1$-$J_n$), spaced apart from each other along an axis of detection (X), an insulation layer (16) for electrically insulating the electrodes ($J_1$-$J_n$) with respect to the inside of the vessel (1), a controller (24) having a plurality of inputs.

Each capacitive element comprises at least one of a single electrode and a group of electrodes connected in common to each other, the single electrode or the group of electrodes being connected to a respective input of the plurality of inputs.

The controller (24) is prearranged for discriminating a value of electrical capacitance associated with each electrode ($J_1$-$J_n$) to deduce the level of the medium present in the vessel.

20 Claims, 21 Drawing Sheets

(56) References Cited

U.S. PATENT DOCUMENTS

| | | | | |
|---|---|---|---|---|
| 2008/0250796 | A1* | 10/2008 | Clugston | B60S 1/0822 62/66 |
| 2009/0224776 | A1* | 9/2009 | Keith | H03K 17/962 324/686 |
| 2009/0301189 | A1* | 12/2009 | Ross, Jr. | G01F 23/265 73/304 C |

OTHER PUBLICATIONS

[Online], "Automotive PSoC Programmable System-on-Chip (TM) CY8C24894", Jun. 5, 2014, 51 pages.

[Online], H. Shruti et al., "Designing a Capacitive Sensing System for a Specific Application", Published in *EE Times*, Dec. 1, 2011, 14 pages.

International Search Report and Written Opinion of the ISA for PCT/IB2015/057043, dated Jan. 12, 2016, 18 pages.

International Search Report for PCT/IB2015/057036, dated Mar. 31, 2016, 7 pages.

Written Opinion of the ISA for PCT/IB2015/057036, dated Mar. 31, 2016, 7 pages.

* cited by examiner 26
20b
25
20
F
27
R1
Rn
24
23
20a
22
X

Jn
J19
20b
J8
F
J1
20
20a
22

16a
26
10
H
16
11
20b
10a
27
H
15
14
20a
12
12a
21
H
13
20

22
20c
22b
12c
22c
21b
22c
12c
20a
20
22a
21

12c
20a
12c
22
10a
12
21b
21a
21
12a
20
13b
13a
13

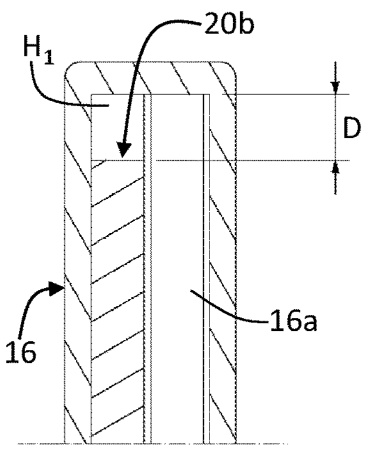
Fig. 12
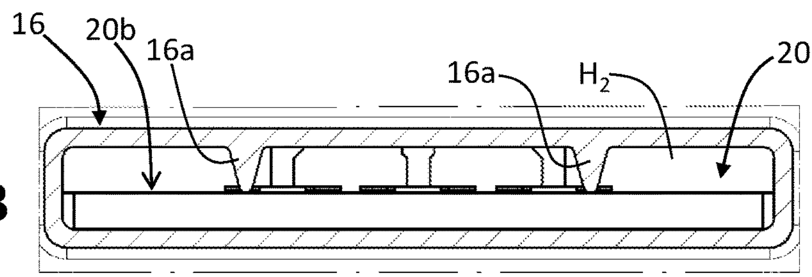
Fig. 13
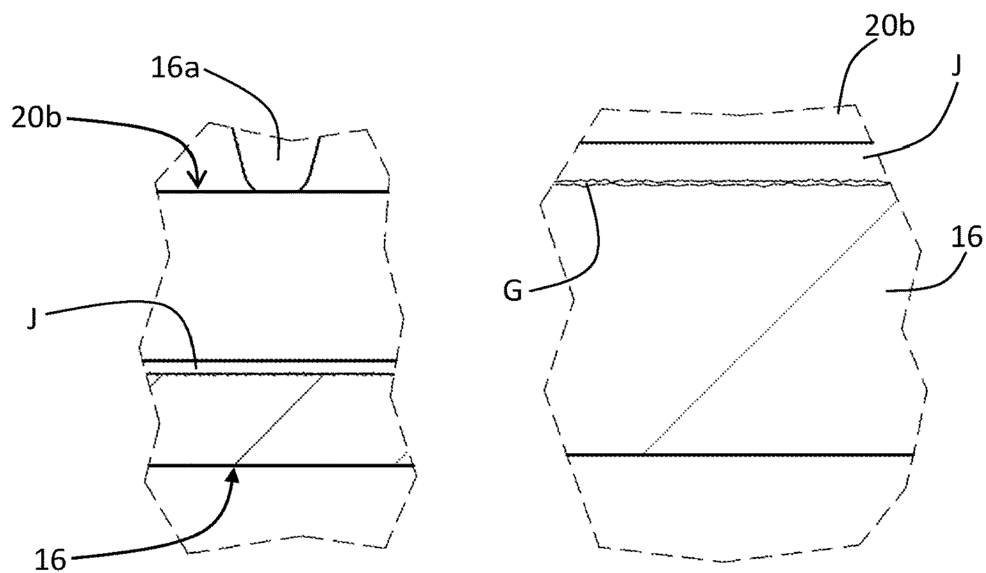
Fig. 14
Fig. 15

J_n
J_36
25
J_21
J_20
J_4
J_1
IN_1
IN_4
24
IN_n

Jn
J51
J36
J35
J34
J19
J18
J17
J2
J1
25
24
IN1 IN2
IN18
IN35
INn

Jn
J51
J35
J18
J1
IN1 IN2
IN18
INn
24

SENSOR FOR DETECTING THE LEVEL OF A MEDIUM

This application is the U.S. national phase of International Application No. PCT/IB2015/054020 filed 28 May 2015, which designated the U.S. and claims priority to IT Patent Application No. TO2014A000439 filed 30 May 2014, the entire contents of each of which are hereby incorporated by reference.

FIELD OF THE INVENTION

The present invention relates to a sensor for detecting the level of a generic medium such as a liquid, a fluid substance, a powdered material or in bulk state, etcetera. The invention has been developed with particular reference to level sensors of the capacitive type used in vehicles.

STATE OF THE ART

Level sensors are used in various fields for detecting a residual amount of a liquid present in a generic vessel, such as a tank. Some of these sensors are based on the use of a floater: these sensors are generally complicated—from a mechanical point of view—and present certain problems, such as risk of jamming. These sensors are inevitably affected by problems related to the possible freezing of the medium being measured.

Level sensors are also known that are based on measuring electrical quantities, such as the conductivity/resistivity or the electrical capacitance. These sensors usually have an array of first electrodes, arranged according to the level detection axis—generally vertical—on a corresponding insulating support intended to be mounted within the tank. The sensors then have a similar array of second electrodes, interposed or facing those of the first array, so that the fluid being measured can infiltrate between the electrodes of the two arrays. In some solutions, in place of a plurality of second electrodes, a common electrode is provided, at a height at least equal to that of the first array. In other solutions still, it is the tank itself that has an inner surface made electrically conductive, for example, by means of a surface metallization, in order to serve as a common electrode. The electrodes are electrically connected to a circuit arrangement, often including a microcontroller, which, by processing the value of the electrical quantity detected between the electrodes, is capable of detecting a transition zone between the liquid and the air in the tank, considered indicative of the level of liquid.

In these known solutions, the electrodes are directly in contact with the liquid and thus subject to premature aging and wear. The operation of these sensor systems is also closely related to the characteristics of the fluid, such as its conductivity/resistivity or its dielectric constant.

Referring to level sensors of the capacitive type, these typically provide at least two electrodes facing each other, between which the liquid for height detection is intended to infiltrate, with these electrodes being energized by an oscillator circuit, that is a circuit that generates an alternating electric signal or a frequency modulated signal. The circuit detects a capacitance variation between the facing electrodes that is proportional to the dielectric variation interposed between the electrodes, or proportional to the level of the interposed liquid, and thus to the electrical capacitance of the sensor element. In these sensors, an output signal is therefore obtained that is proportional to said capacitance variation. Known sensors of this type involve configurations with respective impedance, which can also behave like antennas and have the problem of generating electromagnetic noise (EMI), which noise is likely to interfere with other electronic systems, such as electronic circuits in the vehicle. This phenomenon increases with the increase of the extension of the electrodes, or with the increasing length of the level sensor, which could behave as a transmitter antenna.

Additional types of capacitive sensors involve taking a measurement between at least two coplanar electrodes, for example with an interdigitated configuration, which face towards an insulating wall that separates them from the liquid, where the presence of liquid over the insulating wall causes a variation of the dielectric between the two side-by-side electrodes, allowing a detection. A sensor of this type is known, for example, in U.S. Pat. No. 7,258,005 B2. In these cases, the spacing between the two electrodes must be much greater than the thickness of the insulating wall, typically greater than twice the wall thickness (or the sum of the wall thicknesses interposed between each of the two electrodes and the fluid to be detected), in such a way that any liquid can effectively disrupt the capacitance between the electrodes. In addition to creating encumbrance problems, this type of solution presents limitations in the resolution or measurement accuracy.

Other types of capacitive sensors are mounted on the outside of a tank, such as a fuel tank or an additive tank in a vehicle. These types of sensor are, however, penalized by the fact that the tank must provide high wall thicknesses, in order to ensure the necessary mechanical strength: this involves the need to use signals of greater power frequency to detect the liquid level in the tank and this creates a greater risk of the aforesaid electromagnetic noise.

US 2005/280424 A1 discloses a level sensor having an array of capacitive elements which comprises a plurality of electrodes, barrage spaced apart from each other along a detection axis, and substantially coplanar to each other. The sensor moreover comprises a measuring device, prearranged to measure a value of capacitance between a first electrode considered as measuring electrode and a second electrode considered as counter-electrode.

SUMMARY AND AIM OF THE INVENTION

In general terms, the present invention aims to obtain a simply- and economically-constructed level sensor, distinguished by a high flexibility of use and production and essentially immune from the problems highlighted above.

According to a first aspect, the invention aims to obtain a level sensor which can be manufactured in different lengths, while ensuring precision and reliability.

According to a different aspect, the invention proposes to obtain a sensor that is suitable for carrying out level measurements even in conditions of at least partial solidification or freezing of the medium to be measured.

According to a different aspect, the invention aims to obtain a level sensor capable of distinguishing the presence and/or the height of the different layers and/or different states of the medium subject to detection, such as a sequence of "liquid-air or gas-solid" states and/or layers or a "liquid-solid" sequence or an "air or gas-solid" or "liquid-air or gas" sequence.

According to a different aspect, the invention aims to obtain a level sensor capable of detecting variations in height of the different layers and/or states of the medium subject to detection, such as an increase or decrease in a frozen or solidified layer of the medium, for example, a measure of the level variations in a tank that contains a liquid, during a step of freezing and/or thawing.

According to a different aspect, the invention aims to obtain a level sensor provided with a structure which allows its precise operation, even when faced with stresses due to freezing conditions and/or solidification and/or heating of the medium subject to detection.

At least one of the aims of the invention is achieved by a level sensor and a control method thereof having the characteristics of the attached claims. The claims form an integral part of the technical disclosure provided herein in relation to the invention.

BRIEF DESCRIPTION OF THE DRAWINGS

Further aims, characteristics and advantages of the invention will emerge from the following description, with reference to the attached drawings, provided purely by way of non-limiting example, in which:

FIG. 12 is a second enlarged-scale detail of FIG. 9;

FIG. 13 is a schematic cross-section of a detecting portion of a level sensor in accordance with a possible embodiment of the invention;

FIG. 14 is an enlarged-scale detail of FIG. 13;

FIG. 15 is an enlarged-scale detail of FIG. 14;

DESCRIPTION OF PREFERRED EMBODIMENTS OF THE INVENTION

Figure 1:
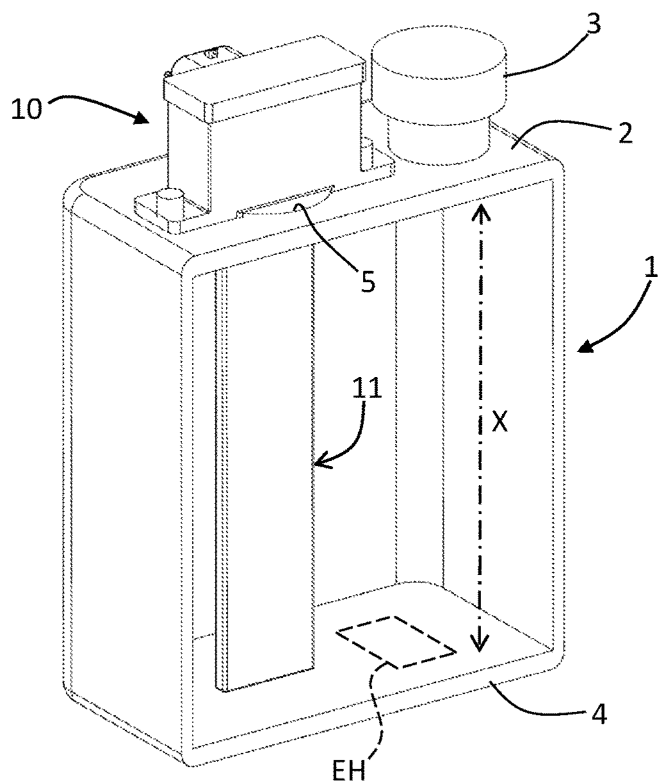
FIGS. 1 and 2 are partially sectioned, schematic perspective views of two possible alternative configurations of the mounting of a level sensor according to the invention on a generic vessel, such as a tank.

The reference to "an embodiment" within this description indicates that a particular configuration, structure, or characteristic described in relation to the embodiment is included in at least one embodiment. Therefore phrases such as "in an embodiment", "in one embodiment" and the like, possibly present in different places of this description, do not necessarily refer to the same embodiment, but may instead refer to different embodiments. In addition, particular conformations, structures, or characteristics defined within this description can be combined in any suitable manner in one or more embodiments, which can even be different from the ones depicted. The numerical and spatial references (such as "upper", "lower", "top", "bottom", "front", "back", "vertical", etc.) used herein are for convenience only and therefore do not define the field of protection or the scope of the embodiments. In the figures, the same reference numerals are used to indicate elements that are similar or technically equivalent.

In FIG. 1, reference 1 indicates as a whole a generic vessel, particularly a tank, for a generic fluid medium or in bulk state. The tank 1 has a main body preferably formed of electrically insulating plastic material. A heater of the type known per se may be possibly associated with the tank 1, used to heat the tank itself and/or its contents, for example, in the case of freezing. An electric heater is shown schematically in the figures by the block indicated by EH.

The tank 1 may, for example, be a tank that equips a motor vehicle. In one embodiment, such as that exemplified here, the tank 1 is intended to equip a vehicle with a diesel engine and the liquid contained in the tank 1 is a liquid known as AdBlue, that is a 32.5% urea solution (minimum 31.8%–maximum 33.3%) in demineralized water, used by an SCR (Selective Catalyst Reduction) system, that is, a system to reduce emissions of nitrogen oxides from exhaust gases produced by a diesel engine.

In the example schematically illustrated, the tank has an upper wall 2, at which an opening—provided with a cap 3 for topping up the liquid—is provided. One wall of the tank 1, for example its bottom wall 4, then has an outlet opening, not visible, through which the liquid flows out of or is aspirated, for example, using a pump, to feed the liquid to the SCR system. Still at the upper wall 2, the tank 1 has a second opening, indicated by 5, at which the body of a level sensor is fixed in a sealing manner, according to a possible embodiment. The level sensor, indicated as a whole by 10, is mounted so as to extend along an axis of level detection, indicated by X, preferably essentially vertical but possibly inclined with respect to the vertical, if required.

The sensor 10 has a detection part 11, intended to extend at least partially inside the tank 1. The distal end region of the detection part 11 is preferably in contact with or at a slight distance from the bottom wall 4 of the tank, i.e. at a height very close to that of the outlet or aspiration opening of the liquid, in order to be able to also detect the presence of a very low level in the tank. In one embodiment not depicted, the distal end region of the detection part 11 is fixed internally to the tank wall 1 opposite to the wall provided with the opening 5 for inserting and fastening the sensor 10, preferably by means of a coupling or quick-release insertion attachment. Preferably, the proximal end region of the detection part 11 extends inside the tank 1 at a height relatively close to the upper wall 2.

In the illustrated embodiment, the sensor body 10 has, at its upper part, elements for fastening thereto the upper wall 2 of the tank. In the example, these means are represented by flange formations with associated screws, not indicated: this embodiment must not, however, be considered limitative, as different solutions for fastening the sensor body 10 are also possible, some of which are illustrated below.

Figure 2:
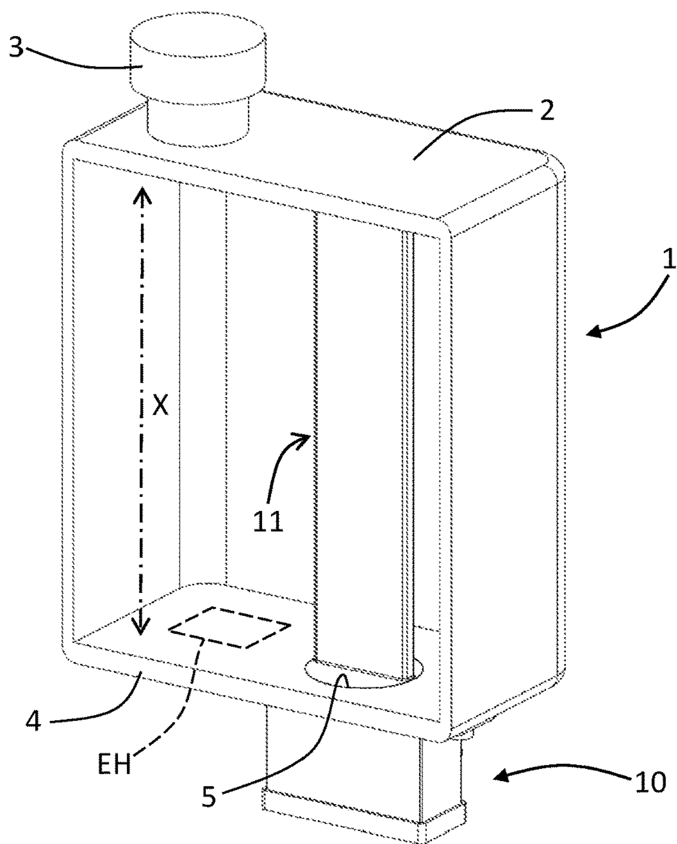

In the example of FIG. 1, the sensor 10 is fixed from above, or associated with the upper wall 2 of the tank. In other embodiments, however, the sensor can be fixed from below, or to the bottom wall 4. An embodiment of this type is illustrated schematically in FIG. 2, where the sensor 10 is sealingly mounted at the opening 5, here defined in the bottom wall 4. In this embodiment as well, a proximal end region of the detection part 11 (here defined lower) is in a position close to the bottom wall 4, while the distal end region (here defined upper) is found at a height relatively close to the upper wall 2; in a solution of this type, the distal end of the part 11 can be fixed to the wall 2 by means of suitable coupling means of the type indicated above.

Figure 3:
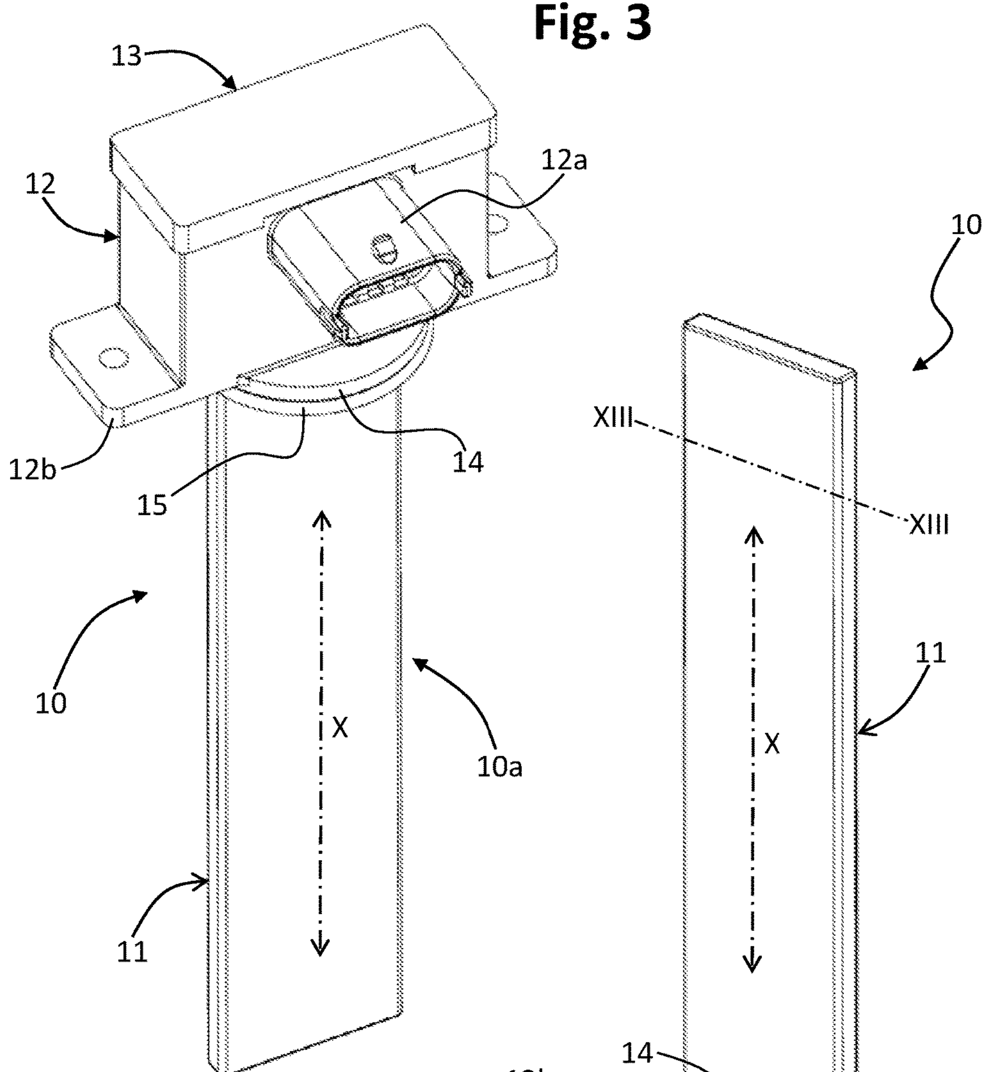
FIGS. 3 and 4 are schematic perspective views, from different angles, of a level sensor according to an embodiment of the invention.
Figure 4:
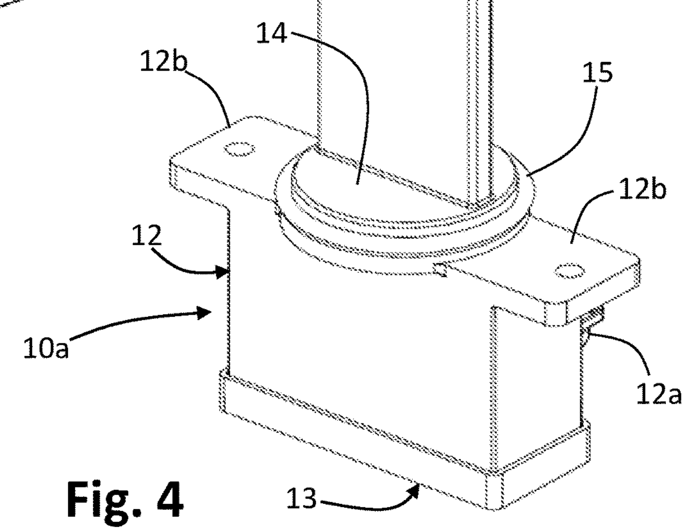

In FIGS. 3 and 4, a sensor 10 according to one embodiment is represented separately, from different angles. At the proximal end of the part 11, the body 10*a* of the sensor 10 defines a box-shaped housing 12, also including a generally hollow connector body 12*a*, provided with electrical terminals as indicated below, preferably projecting from a side wall of the housing. The housing 12 is preferably provided with a closing cover 13, which can be secured in a sealed position, for example, by means of a weld between the plastic material of the housing 12 and the cover 13.

Between the housing 12 and the part 11, the body 10*a* of the sensor 10 preferably defines a portion or formation 14 for sealed coupling at the respective mounting opening on the tank. The formation 14 defines at least one seat for at least one sealing element 15, which can also possibly fulfill functions of elastic mounting of the sensor 10 with respect to the tank. In one embodiment, at least two O-ring type elastic elements are provided, one of which fulfills a sealing function and the other is exploited to obtain an elastic mounting of the sensor 10 on the tank 1, for example for purposes of compensating mounting tolerances. In the illustrated example, the formation 14 has an essentially circular profile and the sealing element is an O-ring seal. In FIGS. 3 and 4, the aforementioned flange formations for fastening the body 10*a* of the sensor are indicated by 12*b*, defined here at the bottom of the housing 12.

Figure 5:
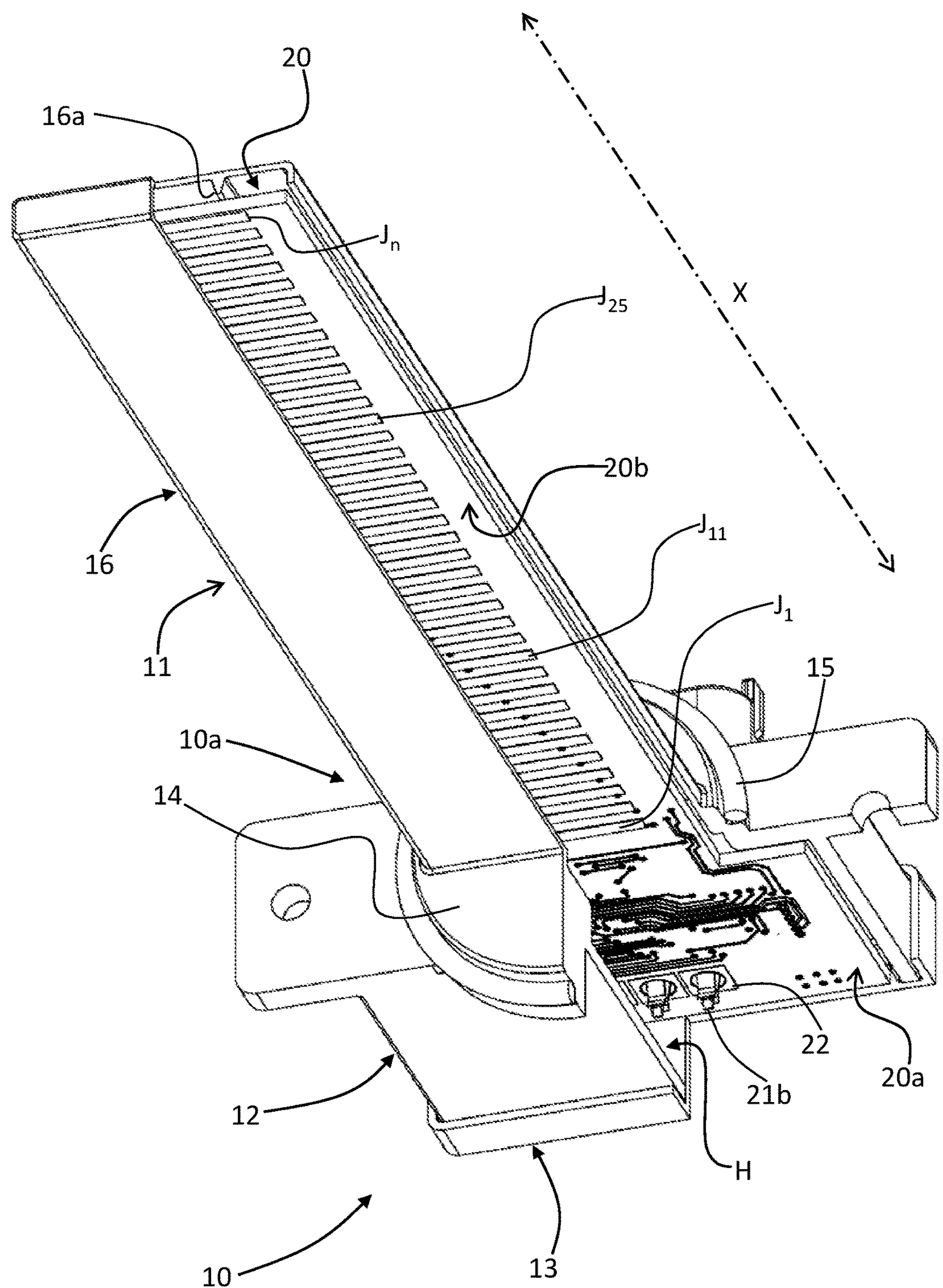
FIG. 5 is a partially sectioned schematic perspective view of a level sensor in accordance with a possible embodiment of the invention.

In FIG. 5, a sensor 10 according to one embodiment is represented in a partially sectioned manner in order to highlight how its body 10*a* is internally hollow to house the components of level detection. From the Figure it can be particularly noted how the body 10*a* of the sensor defines, at the detection part 11, a hollow casing 16, of generally elongated shape; in the illustrated example, the casing 16 has a generally prismatic form, in particular, essentially parallelepiped-shaped. As will be seen, in an embodiment variant, at least the casing 16 can be produced using direct over-molding of electrically insulating plastic material on a circuit support, described hereinafter. More generally, the sensor 10 has at least one insulating layer, to electrically isolate its electrodes (hereinafter described) with respect to the inside of the tank 1.

Figure 6:
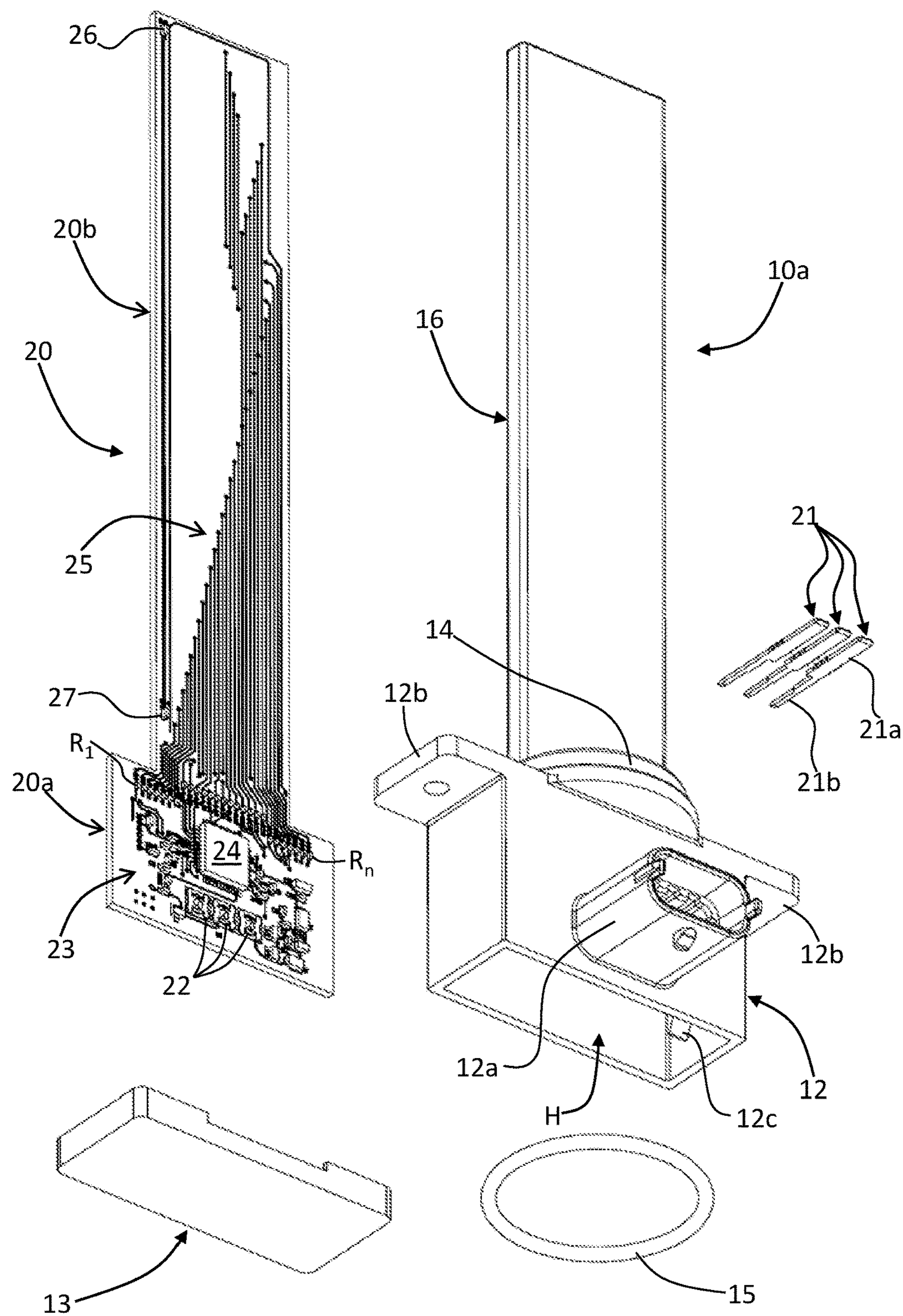
FIG. 6 is a partially exploded schematic view of a level sensor in accordance with a possible embodiment of the invention.

In a preferred embodiment, the housing 12 with the formation 14 and the casing 16 are defined by a single body 10*a* of electrically insulating plastic material, as is clearly visible, for example, in FIG. 6. Moreover, an embodiment is not excluded from the invention whereby the body 10*a* is in distinct parts, fixed to each other in a sealed way, for example, by means of mutual coupling, or by welding or over-molding.

In one embodiment, the body 10*a*, or at least its portion intended for direct or indirect exposure to the liquid (the casing 16 and possibly the attachment portion 14) is formed with a moldable thermoplastic material, such as polypropylene (PP) or with a high density polyethylene (HDPE). Practical tests carried out by the Applicant have, however, allowed the ascertainment that a particularly suitable material—also in view of the particular modes of level detection described hereinafter—is a cyclo-olefin copolymer (COC—Cyclic Olefin Copolymer). Materials of this type—generally used in the medical field—have particularly advantageous characteristics for the application considered here, among which the following should be highlighted: low density, greatly reduced water absorption, excellent barrier properties to water vapor, high rigidity, strength and hardness, high resistance to extreme temperatures and to thermal shock, excellent resistance to corrosive agents such as acids and alkalis, excellent electrical insulation properties, the simple processing using common treatment methods of thermoplastic materials, such as injection molding, extrusion, blow molding, injection blow molding.

The material, or at least one of materials employed for producing the body 10*a* of the sensor 10, may be similar or chemically compatible with a material that forms at least part of the tank 1, for example, in order to allow a sealed weld between the body of the sensor and the tank. One or more of the above-mentioned materials are usable for producing different portions of the body 10*a*, such as the housing 12 with the formation 14 and the casing 16, even when the body 10*a* is formed in separate pieces rendered integral with each other. Of course, the cover 13 can also be made with one of the materials indicated.

Still with reference to FIG. 5, it can be seen that the electric and electronic components of detection are housed in the cavity defined by the body of the sensor 10—indicated as a whole by H. In a preferred embodiment, these components are mounted on an electrically insulating substrate 20 that forms a support of the circuit. The support 20 is formed with a material suitable for producing printed circuit boards such as for example FR4, or a similar composite material such as fiberglass, or a ceramic or polymeric-based material, preferably a moldable material for the purposes of producing the support 20.

In the circuit support 20, a first portion 20*a* is defined, designed to be received in the housing 12, and a second portion 20*b*, designed to be received within the casing 16. The electronic control components of the sensor 10 are predominantly associated with the portion 20*a* of the support 20, as well as the corresponding terminals for the outer electrical connection of the sensor 10; the detection components are instead associated with the portion 20*b* of the support 20, including a series of electrodes; some of said electrodes are indicated in FIG. 5 with the letter "J", followed by the number that identifies the position of the electrode in the series that extends from the proximal end (electrode $J_1$) to the distal end (electrode $J_n$) of the detection part 11, or of the portion 20*b* of the support 20.

In the illustrated example, a single circuit support is provided in which the parts 20*a* and 20*b* are defined, but in possible variant embodiments, more circuit supports can be provided, connected by suitable electrical interconnection means and possibly mechanical interconnection means (for example, a circuit support corresponding to the portion 20*a* and a circuit support corresponding to the portion 20*b*, with conductors or electrical connectors for connecting electrically conductive tracks of a portion to electrically conductive tracks of the other portion).

In FIG. 6, a sensor 10 according to one embodiment of the invention is represented by means of an exploded view, from which the various parts already identified above are detectable. In this Figure, the above-mentioned terminals are visible, indicated by 21, preferably of a generally-flattened form, for example made by molding and/or cutting from a metal strip, which obtain with the connector body 12*a*, integral with the housing 12, an interface for the external connection of the sensor 10, for example to a control unit of the SCR system of the vehicle In one embodiment, each terminal 21 has a lamina contact portion 21*a*, intended for positioning within the cavity of the connector body 12*a* and a narrow interconnection portion 21*b*, intended for electrical and mechanical coupling with respective contacts 22 on the support 20, particularly in its portion 20*a*, described hereinafter.

Figure 7:
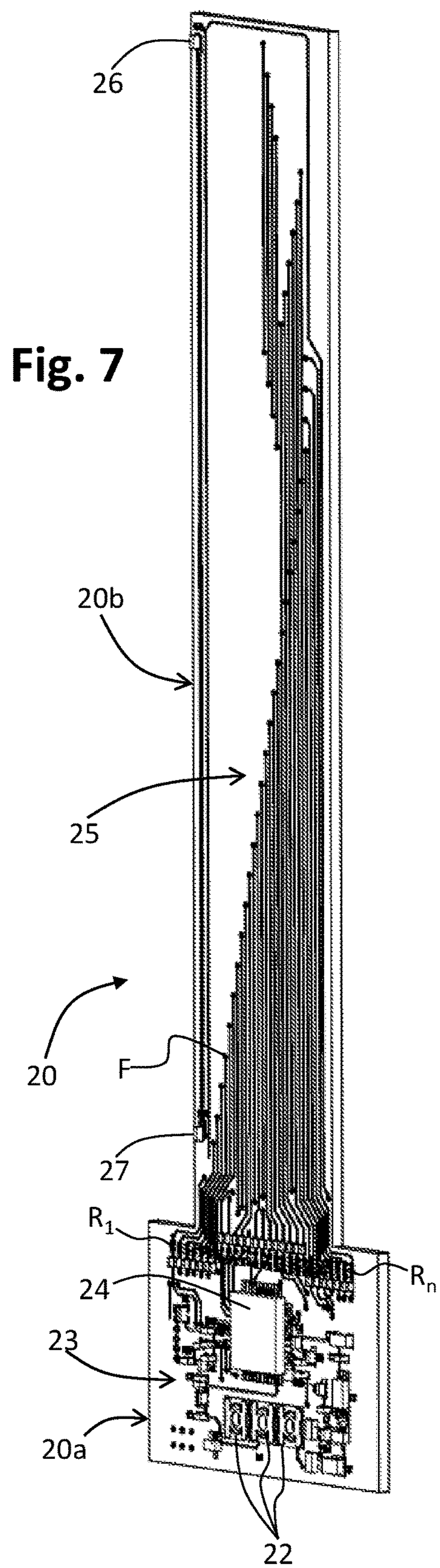
FIGS. 7 and 8 are schematic perspective views, from different angles, of a circuit of a level sensor in accordance with a possible embodiment of the invention.
Figure 8:
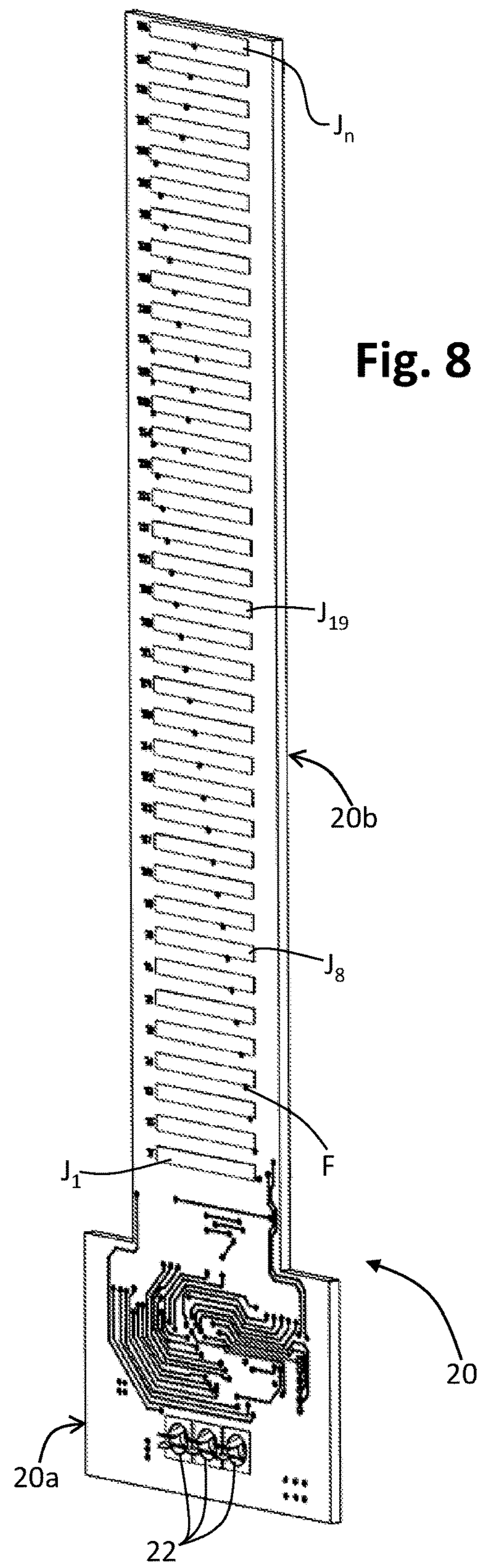

Still with reference to FIG. 6, the support 20 is visible as a whole, with the corresponding parts 20*a* and 20*b*, with associated corresponding electric and electronic components; the same support 20 is also represented separately in FIGS. 7 and 8, by means of opposite views of its major faces. The circuit support 20, of generally elongated and preferably flattened shape, is associated with a control circuit arrangement, indicated as a whole by 23, on one of its major faces here conventionally defined "back", preferably comprising an electronic controller 24, for example, a microcontroller. The controller 24 preferably comprises at least one processing and/or control logic unit, a memory circuit, as well as inputs and outputs, among which analogue/digital inputs.

The components of the circuit arrangement 23 are connected to electrically conductive tracks provided in the portion 20*a*, visible for example in FIG. 8, not indicated; a series of electrically conductive tracks 25 is then provided on the back of the portion 20*b* of the support, for the electrical connection of the electrodes J of FIG. 5—preferably with metallized holes for the connection between tracks on different surfaces—and of possible other components to the arrangement 23.

In one embodiment, the circuit comprises at least one temperature sensor, particularly provided on the corresponding circuit support 20. This sensor, for example of the NTC type, can be mounted at at least one of the distal end region and the proximal end region of the portion 20*b* of the support 20. In the example depicted, on the portion 20*b* of the support 20, particularly at the back, two temperature sensors 26 and 27 are mounted, at opposite end regions of the portion 20*b*, connected to the circuit arrangement 23 by means of corresponding conductive tracks. Assuming a mounting of the sensor 10 on the tank 1, of the type illustrated in FIG. 2, the temperature sensor 27 is usable for detecting the temperature of the liquid, while the sensor 26—which, in the mounted condition, is located closer to the upper wall of the tank—can be used to detect the temperature that exists in the inner volume of the tank above the liquid, for example the air temperature. A configuration of the type represented, in particular with two temperature sensors 26 and 27, allows mounting of the sensor 10 in the tank 1 both in the configuration of FIG. 1 and in the configuration of FIG. 2, reversing the functions, at the software level, such as the functions of the two sensors and/or the functions of the electrodes J.

A sensor for temperature detection can possibly be provided within the portion 20*a* of the support, or within the housing 12. It is, of course, also possible to provide more than two temperature sensors, for example, with one or more sensors in intermediate positions compared to the sensors 26 and 27.

In FIG. 8, the front of the support 20 is clearly visible, in which the electrodes J are arranged in the portion 20*b*, only some of which are indicated. In the depicted non-limiting example, the electrodes J—equal in number to 37—are arranged according to an array which extends along a lengthways direction of the portion 20*b* of the support, or along the detection axis X, spaced apart from each other. The electrodes J are formed with electrically-conductive material, for example, a metallic material or a metallic alloy and are associated with the front of the portion 20*b* of the support 20. The electrodes J are preferably coplanar with each other and can be, for example, in the form of plates or laminae, either engraved or applied on the support 20, or formed of an electrically-conductive layer—similarly to the tracks 25—deposited on the support 20, for example, by the technique of serigraphy or the like.

As mentioned, in one embodiment, the support 20 has through-holes—partially visible in FIGS. 7 and 8, one of which is indicated by F—containing conductive material for the electrical connection between the electrodes J provided on the front of the portion 20*b* and the conductive tracks 25 present on the back of the same portion of the support 20.

In FIG. 6, a part of the blind cavity H is visible, which extends axially within the body 10*a* of the level sensor, or in its parts 12, 14 and 16. Within this cavity H, guide and positioning elements of the support 20 are preferably provided, some of which are partially visible in FIGS. 5 and 6, where they are indicated by 16*a* and 12*c*, respectively, at the casing 16 and the housing 12. Positioning elements of the support 20 may also possibly be provided in the cover 13.

Figure 9:
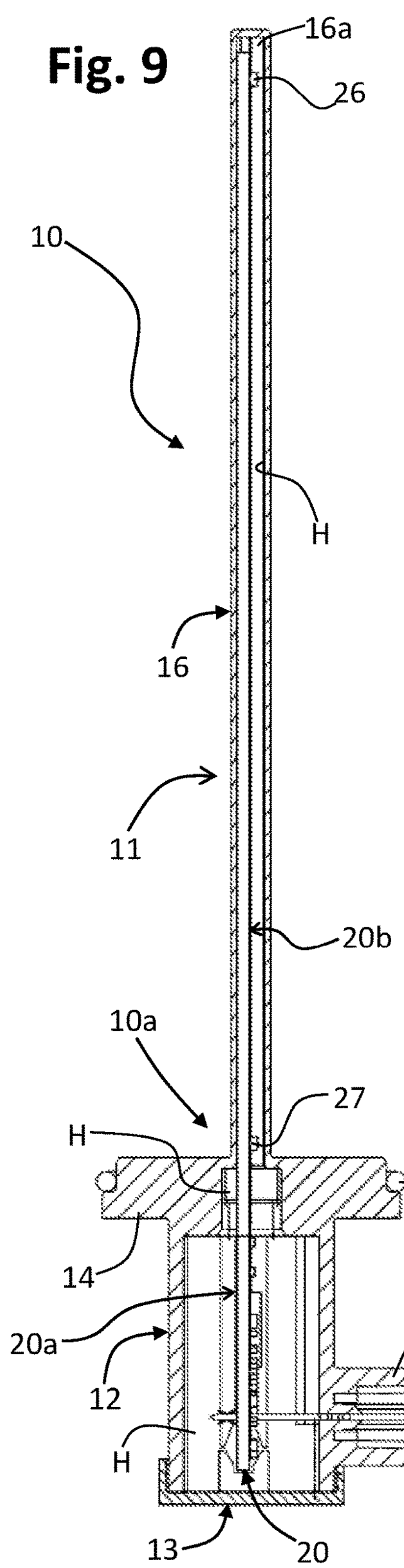
FIG. 9 is a schematic longitudinal cross-section of a level sensor in accordance with a possible embodiment of the invention.

In FIG. 9, the level sensor 10 is visible in longitudinal cross-section, where the presence of the blind cavity H is clearly evident, which extends within the housing 12, the attachment formation 14 and the casing 16, the circuit support 20 being housed in this cavity H. It is clearly evident from this Figure how, in one embodiment, the temperature sensor 27 is in a position close to the formation 14 or, generally—in a mounted condition of the sensor 10—in a position close to the wall of the tank 1 provided with the mounting opening of the sensor 10. Moreover, comparing between FIGS. 7-8, on the one hand, and FIG. 9 on the other hand, it is apparent that the electrode indicated by $J_1$ is, in the mounted condition of FIG. 2, in a position close to the lower wall of the tank, preferably a position reachable by the liquid, even in a condition of minimum filling of the tank. As will be seen, in one embodiment, the electrode $J_1$ is used to provide a reference value used during the detection of the liquid level. Furthermore, one or more reference electrodes J may also be provided in other zones of the portion 20*b* of the support 20.

In FIG. 9, the connector body 12*a* is also visible, with one of its terminals 21. The terminals 21 can be fitted with interference into corresponding passages defined in the connector body 12*a*, or possibly at least the body of the housing 12 can be over-molded to the terminals. Preferably, the terminals—and the corresponding passages of the connector body—extend longitudinally in a direction essentially perpendicular with respect to a plane defined by the circuit support 20 and/or by the electrodes J.

Figure 10:
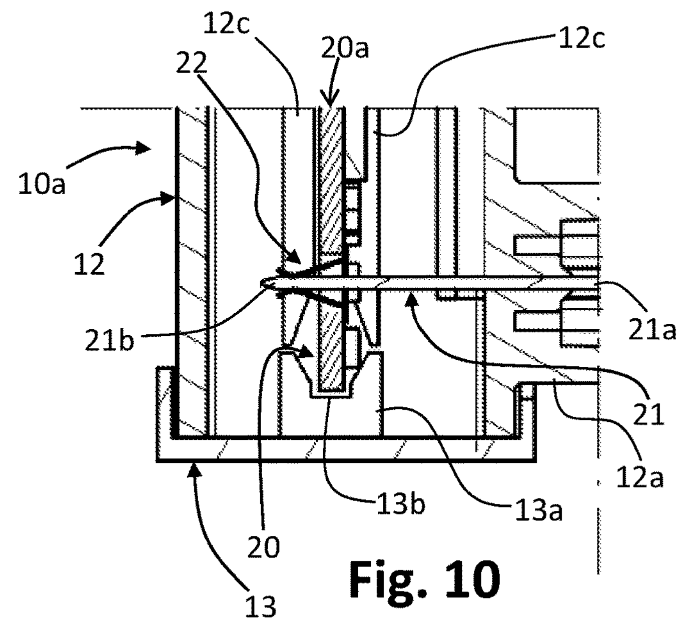
FIG. 10 is a first enlarged-scale detail of FIG. 9.

In one embodiment, the contacts 22 are configured for elastic coupling with terminals 21, in order to obtain the mutual electrical and mechanical connection between them. In FIG. 10, and in even greater detail in FIG. 11, a possible coupling mode is visible between the portion 21*b* of a terminal 21 with a corresponding contact 22 provided in the portion 20*a* of the support.

Figure 11:
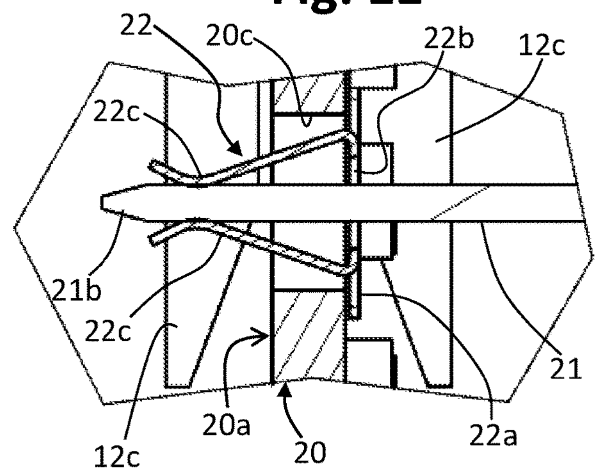
FIG. 11 is an enlarged-scale detail of FIG. 10.

In the exemplified embodiment—see in particular FIG. 11—the contacts have a flat base 22*a* provided with a hole or central passage 22*b*; from the base 22*a*, at least two flaps 22*c* branch off from opposite sides of the passage 22*b*, converging toward each other. The body of the contacts 22 is formed of an electrically conductive material, such as a metal or a metal alloy, for example phosphor bronze, preferably coated with tin or gold or other material suitable for improving the electrical contact.

The flaps 22*c* are inserted into a corresponding through-hole 20*c* defined in the portion 20*a* of the support and the base 22*a* is fixed and/or welded to a surface of the support itself or its conductive tracks. Preferably the hole 20*c* is surrounded by electrically conductive material of one of the tracks of the circuit pattern of the circuit arrangement 23, with the base 22*a* of the contact 22, which is at least partly superimposed on the said conductive material, so as to obtain the electrical connection. As also visible in FIG. 11, in the assembled condition, the passage 22*b* of a contact is essentially aligned with the hole 20*c* of the support 20, with the base 22*a* leaning against a surface of the support itself (here the rear surface) and with the flaps 22*c* that preferably protrude from the hole 20*c* at the opposite surface (here the front surface) of the support 20.

For the purposes of assembling the sensor, the support 20, already provided with the corresponding electric and electronic components, is inserted into the cavity H of the body 10*a* of the sensor 10 at its open part, or at the housing 12. Following this insertion, therefore, the portion 20*b* of the support 20 is mainly positioned within the casing 16, while the portion 20*a* is positioned within the housing 12. The position of the contacts 22 and the holes 20*c* on the support 20 is such that, following the aforesaid insertion of the support 20 into the body 10*a*, these holes and contacts are facing towards the inner passages to the connector body 12*b*. The terminals 21 are then fitted with interference into the corresponding passages of the connector body 12*a*, so that the respective interconnection portions 21*b* penetrate the holes 22*a* and 20*c* of the contacts 22 and the support 20, respectively. The portions 21*b* of the terminals are then inserted between the flaps 22*c*, causing an elastic gap, which ensures an adequate electrical connection and a well-balanced mechanical connection. Preferably, this elastic electrical connection is also suitable for avoiding any damage to the support 20 and the corresponding circuit, due, for example, to possible mechanical stresses during the use of the sensor 10, such as vibrations or stress applied to the terminals 21.

It can be appreciated that the assembly of the sensor is very simple and easily automatable, involving elementary operations, constituted by the insertion of the circuit support 20 into the cavity H of the body 10*a* and the subsequent fitting of the terminals 21 into the corresponding passages of the connector body 12*a*.

As mentioned, in one embodiment, the body 10*a* of the sensor 10 is provided with positioning and/or guiding elements of the support 20. The presence of these elements further simplifies the assembly of the sensor 10, while at the same time ensuring a high accuracy of mounting between the parts and greater measurement accuracy. The aforesaid positioning elements can be provided in at least one the housing 12 and the casing 16, preferably both in the housing and in the casing. As already mentioned, one or more positioning elements can be provided in the cover 13 of the housing 12.

Referring, for example, to FIGS. 10 and 11, in one embodiment, on the inner side of each of two opposite side walls of the housing 12, insertion and positioning guides are defined, indicated by 12*c*, generally parallel to one another and between which an edge region of the support 20 can be engaged, particularly at its portion 20*a*. In the illustrated example, the guides 12*c* are defined as raised on the inner surface of the aforesaid opposite walls of the housing 12 (see also reference to FIG. 6, in which the top of a guide 12*c* is visible), but an embodiment is not excluded from the scope of the invention in which guides having purposes similar to those of the guides 12*c* are formed by recesses, which extend in the longitudinal direction of the sensor body 10. Preferably the top of the guides 12*c* is shaped so as to have a centering guide, here defined by an inclined surface, configured for facilitating the entrance of the opposite edges of the portion 20*a* of the support into the respective pairs of guides 12*c*. The portion 20*a* of the support 20 can be inserted with slight interference fit between the guides 12*c* or with minimal clearance.

From FIG. 10 it is also visible how, in a preferred embodiment, the cover 13 also has, on the inner side of its top wall, a positioning formation 13*a*, defining a seat for the proximal or upper edge (referring to the Figure) of the portion 20*a*. Preferably, in this case as well, the positioning formation 13*a* is shaped in such a way as to define a centering guide, here including two convergent inclined surfaces, in order to facilitate the entrance of the proximal or upper edge of the portion 20*a* into the corresponding seat when the cover 13 is mounted on the housing 12. The formation 13*a* preferably comprises a surface or a stop element 13*b* suitable for preventing undesired axial movements of the support 20.

In a preferred embodiment, between the distal end of the casing 16 and the distal end of the support 20 (i.e. of its portion 20*a*), a free space or gap is defined, particularly to allow compensating for possible different expansions between the material that forms the casing 16 and the material that forms the support 20: this gap is indicated by $H_1$ in FIG. 12, which represents an enlarged detail of FIG. 9, particularly of the distal end portion of the sensor 10. To clarify this aspect, a preferential field of use of the sensor 10 is considered, the vehicle sector, which envisages the reaching of very low temperatures, for example down to −40° C., with a production of the device that instead essentially occurs at ambient temperature, for example 25° C.: referring to this numerical example, the sensor 10 is therefore subject to considerable thermal fluctuations, to which retractions of the casing 16 correspond, which vary according to the plastic material used.

Using the hypothesis of having this temperature difference, or delta, of 65° C. (from +25° C. to −40° C.), the gap $H_1$ is therefore provided, so as to allow a free contraction of the casing 16, without it coming into contact with the distal end or edge of the support 20 and/or this gap $H_1$ is provided in order to avoid that said contraction of the casing 16 damages one or more electrodes J. Referring to the previously mentioned materials, the following thermal expansion values can be considered:

HDPE=>200 ppm/° C.

PP=>120 ppm/° C.

COC=>60 ppm/° C.

FR4 (support 20)=>20 ppm/° C.

Now considering the formula $H_1$ [mm]=unit h [mm/mm]× length Lu of the sensor [mm], for the thermal delta exemplified here (65° C.), the following values of the unit h can be considered:

h for HDPE=0.012 mm/mm h for PP=0.007 mm/mm h for COC=0.003 mm/mm

Therefore, for example, for a sensor body 10 with Lu=150 mm, made of HDPE, the minimum value of $H_1$ is equal to 0.012×150=1.8 mm; for a sensor body of identical length Lu made of PP, the minimum value of $H_1$ is equal to 0.007×150=1.05 mm; for the same sensor body made of COC, the minimum value of $H_1$ is equal to 0.003×150=0.45 mm.

In a preferred embodiment, the portion 20*b* of the circuit support 20 is positioned within the casing 16 of the body 10*a* of the level sensor in such a way that its front, or its face provided with the electrodes J, is adjacent or resting against the corresponding inner surface, preferably at least partially in contact with it. For this purpose, preferably, within the casing 16, one or more positioning elements are provided, tending to push the portion 20*b* of the support towards a wall of the casing 16. In one embodiment, from the inner side of a wall of the casing 16, at least one said positioning element protrudes, which extends in the direction of the opposite wall of the same casing.

One possible embodiment, to this end, is shown in FIG. 13, which represents a cross-section of the casing 16 (particularly according to a plane orthogonal to the X axis, passing, for example, along the line XIII-XIII of FIG. 4): from this Figure, it can be noted that, from the inner side of one of the longer walls of the casing 16, two projections 16*a* protrude (one of which is also visible in FIGS. 5 and 9), generally parallel to each other and which extend in the longitudinal direction of the casing, preferably but not necessarily for its entire length (such projections could also have intermediate interruptions). The projections 16*a*, here defined integrally with the body 10*a* or with the casing 16, preferably have a tapered profile, so that their generally pointed or tapered top is pressed against the back of the portion 20*b* of the support 20. It is evident that, following the insertion of the support 20 into the cavity H, the projections 16*a* are configured to press the front of the part 20*b* against the inner surface of the wall of the casing 16 opposite to that from which the projections themselves are raised. This pressure advantageously has an elastic component, due to a certain elasticity of the plastic material forming the casing 16.

In one embodiment, the positioning element 16 or each positioning element 16 is formed of a material different from that of the casing 16, such as an elastomer, for example, mounted or co-molded or over-molded to the casing 16 and/or having a different shaped from that represented, while configured to operate in a thrust manner and/or elastically on the support 20 and the electrodes J.

In a preferred embodiment, the projection or projections 16*a* are configured to be able to elastically yield and/or deform, at least in their top zone, so as to possibly allow the insertion of the support 20, even in the case in which the thickness of the latter is greater than the distance between the tip of the projections 16*a* and the inner surface of the casing 16 facing this tip (a condition that could occur when facing dimensional tolerances due to different retractions of the plastic material during the corresponding molding), while guaranteeing the aforesaid thrust.

In one embodiment, within the casing 16—or in any case at least between the support 20 and its corresponding wall facing the casing 16*a*—a fluid filling material is introduced, which is not electrically conductive, preferably in order to ensure the absence of air bubbles—particularly between the electrodes J and the casing 16—which could invalidate the correct measurement of the level, performed according to the methods described below. The aforesaid filling material, which is preferably intended to encapsulate and/or be in contact with at least the portion 20*b* of the support 20, may be for example a polyurethane resin or, preferably, a gel, most preferably a silicone gel. A silicone gel suitable for this application is, for example, that known as SilGel® 612, marketed by Wacker Chemie AG, Monaco, Germany.

The presence of the said gel mainly has the function of filling any gaps that may arise between the front of the portion 20*b* of the sensor and the wall of the casing 16 facing it: these gaps—despite having a minimal volume—may exist, for example, due to the surface roughness of the support 20 and/or the electrodes J, or even when the electrodes J have a thickness which results in a slight projection from the front surface of the portion 20*b* of the circuit support, or again due to the roughness and/or possible deformation of the wall of the casing 16, for example, as a result of the surface finish of the corresponding mold and/or the different retraction of the polymeric and/or thermoplastic material in the case of molding of the casing 16.

The concepts outlined above are further clarified by the details of FIGS. 14 and 15. In the detail of FIG. 14, the top of a projection 16*a* is clearly visible, which presses on the back of the portion 20*b* of the support, thereby pushing the electrodes—one of which is indicated by J—against the inner surface of the facing wall of the casing 16. The further enlargement of FIG. 15 shows the interface zone between the electrode J and the aforesaid wall of the casing 16, from which it is possible to detect how—in the exemplified case—the facing surfaces of the two elements in question have respective micro-cavities, for example due to surface roughness and/or deformations of materials (for example different retractions of the material during the molding, slight curvatures, etc.). In the presence of the aforesaid gel—indicated by G in FIG. 15 at the interface between the aforesaid micro cavities—the projections 16*a* push the part 20*b* of the support 20 against the inner surface of the casing 16, thereby facilitating discharge of the excess gel between the two parts in question: in this way, between these facing parts only a film of gel G remains that is strictly necessary to fill the said micro-cavities. The above-mentioned discharge of the excess gel G is preferably allowed by the presence of at least one escape chamber in the casing 16, for example comprising the part of the cavity H, internal to the casing 16, which is not occupied by the support 20 or the projections 16*a*: this chamber is indicated schematically by $H_2$ in FIG. 13 (the chamber $H_2$ can possibly comprise the space previously indicated by $H_1$).

From FIG. 14, a deformation or slight removal of material from the top of projection 16*a* can also be appreciated, which in the example specifically assumes a nominally rounded tip: as explained, the tapered shape of the projections 16*a* aims to enable a deformation, particularly in the case in which the portion 20*b* of the circuit support is inserted in a forced manner into the cavity of the casing 16 (for example, in the case of excessive dimensional retractions or tolerances resulting from the molding of the casing itself), and to ensure both the mentioned thrust, in order to obtain a good contact between the electrodes J and the inner surface of the casing 16, as well as to remove the excess gel, for the purposes of a reliable and accurate detection. In this regard, it is considered that, in the preferred embodiment, the gel is introduced into the cavity of the casing 16 in order to essentially fill it, but for practical purposes it is sufficient that the gel is present in the interface zone between the portion 20*b* of the support with the electrodes J and the facing surface of the casing 16, where the excessive gel can flow out, as mentioned, into the aforesaid outlet chamber $H_2$ within the casing.

Figure 16:
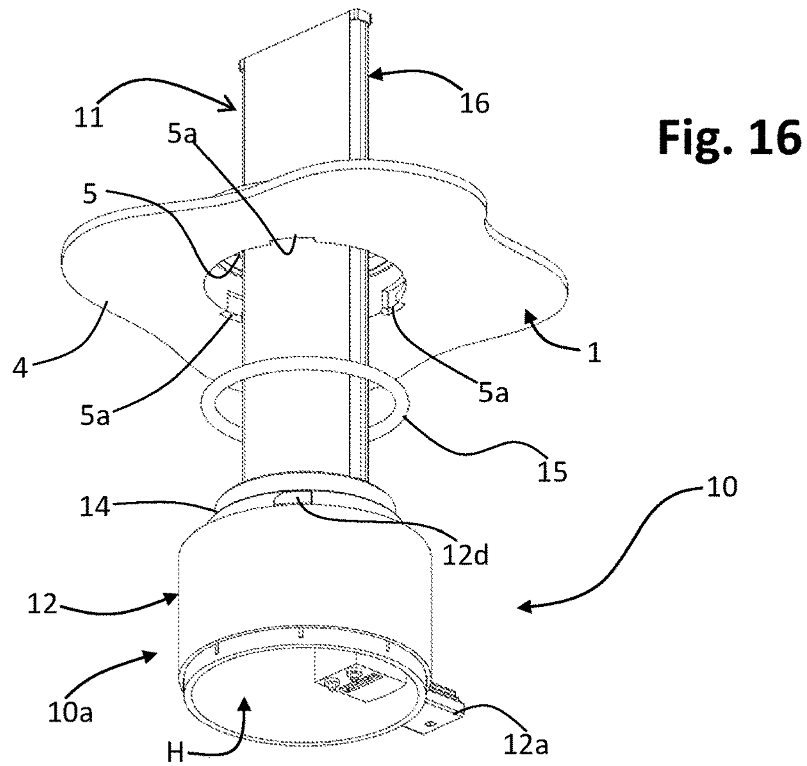
FIGS. 16, 17 and 18 are perspective, partial and schematic views, of possible alternative mounting or fastening configurations of a level sensor in accordance with a possible embodiment of the invention.

As already mentioned, the methods of fastening the body 10*a* of the level sensor 10 to the tank can be different to those previously exemplified. In general, the coupling can be based on the presence of raised elements associated with at least one of the body 10*a* of the sensor 10 and the tank 1, provided for coupling with cavities or seats present on the other of the tank 1 and the body 10*a* of the sensor, the coupling preferably taking place following a movement that is partly axial and partly angular. In one embodiment, the mechanical coupling between the body 10*a* and the tank is a quick coupling, for example a snap-fit or a threaded coupling or a quick-release insertion. FIG. 16, for example, exemplifies the case of a coupling between the sensor 10 and the tank 1 based on a coupling system essentially of the bayonet type. In this example, the body 10*a* of the sensor is provided, in its attachment portion 14, with a plurality of teeth or surface engagement projections, only one of which visible, indicated by 12*d*, intended for coupling with respective coupling seats 5*a* defined in peripheral positions with respect to the opening 5 of the wall of the tank 1 provided with the opening 5, here the lower wall 4. Preferably, this wall of the tank 1 has, at the opening 5, a cylindrical housing for receiving the attachment portion 14 and the corresponding seal 15, with the seats 5*a* which extend between the upper face of the wall 4 and the cylindrical surface of the aforesaid housing. For the purposes of coupling, the body 10*a* is inserted through the opening 5, until the seal 15 rests on a corresponding abutment surface defined in the aforesaid cylindrical housing, in which the attachment portion is also received. This insertion is carried out so that the projections 12*d* fit into an essentially vertical portion of the respective seats 5*a*; a subsequent angular movement imparted to the body 10*a* determines the passage of the projections 12*d* in an essentially horizontal portion of the seats 5*a*, with a consequent coupling between the parts, which typically occurs in bayonet coupling of known type (being able to, however, also provide inclined portions in the seats 5*a*).

In one embodiment, a coupling within the tank is provided, either additionally or alternatively, such as a coupling based on coupling projections associated with at least one of the distal end of the sensor 10 and the facing wall of the tank, which coupling projections couple with cavities present on the other of said distal end and wall. For example, the distal end of the casing 16 can be provided with one or more coupling projections or teeth, preferably radial projections, intended for coupling to respective coupling seats defined in an element which is raised from the tank wall facing the said distal end. This coupling within the tank may involve technically equivalent elements to those described with reference to the example of FIG. 16.

A coupling of the type illustrated in FIG. 16, in addition to not requiring specific tools, allows the obtainment of an elastic mounting of the body 10*a* of the sensor 10 on the tank 1. In the embodiment of FIG. 16, the shape of the housing 12 is essentially cylindrical, without prejudice to its characteristics described above.

In one embodiment, the fastening between the body 10*a* of the level sensor and the tank 1 is of the permanent type, made for example by gluing or welding. A solution of this type is exemplified in FIG. 17, according to which, from the outer side of the wall 4 of the tank 1 (but it could be the wall 2) an annular projection 2*a* is elevated, here an essentially quadrangular projection, which circumscribes a region of the wall 4 in which the opening 5 is defined, here consisting essentially of a slit having cross-sectional dimensions that are slightly greater than those of the casing 16. In this case, the attachment portion 14 of the body 10*a* has a shape that is essentially complementary to the closed profile defined by the projection 2*a*, i.e., quadrangular in the example illustrated, and is preferably provided with its own annular projection, complementary or a mirror image of the projection 2*a*, not shown. For the purpose of coupling, the casing 16 of the body 10*a* is inserted into the opening 5, until the attachment portion 14 couples with the projection 2*a*. The definitive fastening between portion 14 and projection 2*a* can be achieved through an adhesive deposited on at least one of the two parts in question (with a type of glue that also fulfills sealing functions) or by welding together the portion 14 and the projection 2*a*, for example through a weld produced by laser or by vibrations or ultrasound, or even with the re-melting of the material or the type defined hot blade. Of course, in this case, the materials forming the wall 2 or 4 of the tank 1 and the attachment portion 14 of the sensor body will be compatible materials in view of the weld.

Figure 17:
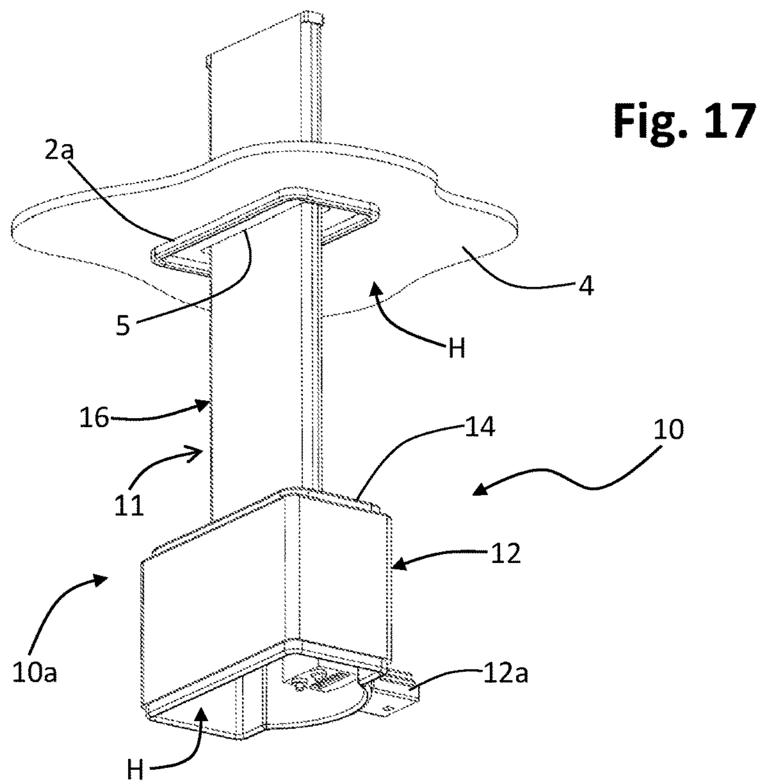

In the embodiment of FIG. 17, the wall of the housing 12 from which the connector body 12*a* protrudes and the connector body itself have a different structure compared to the cases previously illustrated, without prejudice to the characteristics of the device described with reference to FIGS. 1-15. In FIGS. 16 and 17, the connection between the terminals within the connector body 12*a* and the inner circuit of the sensor 10 is also different from that previously exemplified. According to these variants, electrical connectors are preferably provided, equipped with a connector body 12*a* shaped so as to define the keying means, configured to allow the univocal coupling with a respective outer electrical connector, and/or with polarization means, configured to only allow coupling with said outer connector in the correct direction, thereby avoiding reverse polarity or incorrect connections.

Figure 18:
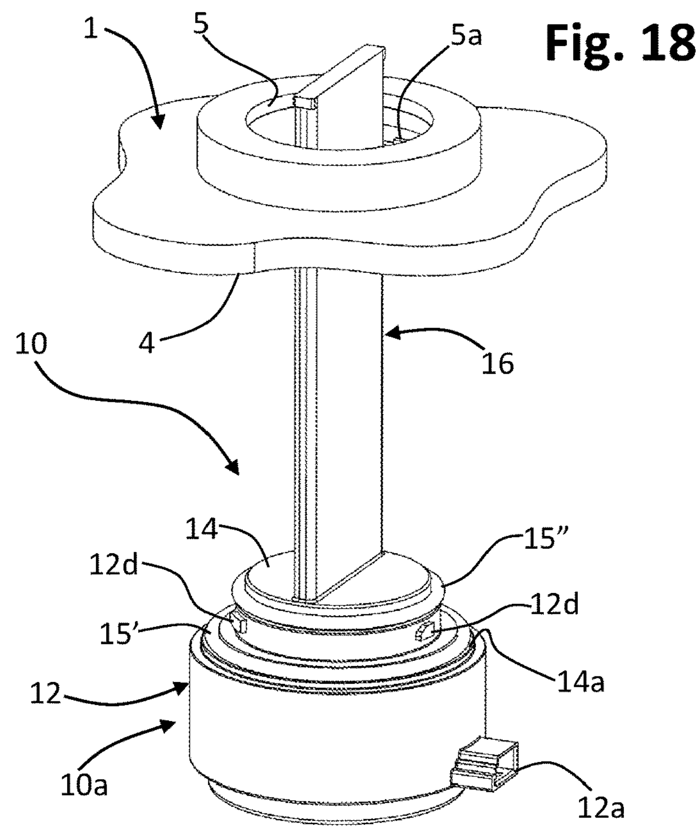
Figure 19:
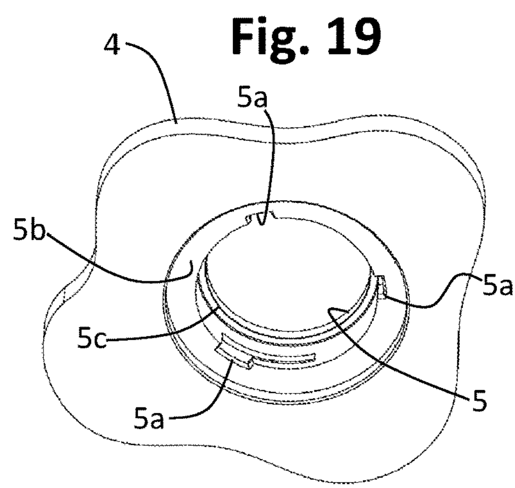
FIG. 19 is a perspective, partial and schematic view, of a portion of a vessel on which a level sensor according to FIG. 18 can be associated.

FIG. 18 illustrates a variant embodiment similar to that of FIG. 16, but distinguished by the presence of two elastic elements 15' and 15", represented here by O-type rings, with the attachment portion 14 defining corresponding seats for these elements. Preferably, the coupling surface projections 12*c* are defined in the portion 14 in an intermediate position relative to the two elastic elements 15' and 15", or in a position intermediate to the corresponding positioning seats. As shown in FIG. 19, in one such embodiment, the cylindrical housing is formed at the mounting opening 5, in order to have two axial support surfaces 5*b* and 5*c* for the elements 15' and 15", respectively, with the coupling seats 5*a* for the projections 12*d* which are in a position intermediate to these surfaces.

In this embodiment, the lower seal 15" performs sealing functions, particularly a radial sealing between the portion 14 of the body 10*a* and the inside of the corresponding cylindrical housing. The elastic element 15' is instead intended to be axially compressed between the corresponding support surface of the portion 14—indicated by 14*a* in FIG. 18—and the surface 5*b* of the cylindrical housing: in this way, in the assembled condition, the elastic reaction of the element 15' pushes the body 10, as a whole, outwards relative to the housing (downwards, with reference to FIG. 18), ensuring an elastic mounting and the recovery of possible tolerances between the parts involved.

As said, the mounting configurations described with reference to FIGS. 16-19 can also be used when the level sensor 10 is associated with the upper wall of the tank, similarly to that shown in FIG. 1.

As seen, in the embodiments cited thus far, the level sensor 10 includes an array of capacitive elements, which each include a single electrode $J_1$-$J_1$, ("n" being equal to 37, in the examples illustrated thus far). Here, the term "single" means that each electrode J belongs to a capacitive element that does not require an additional electrode, as typically occurs in the known capacitive level sensors, which presuppose the presence of pairs of facing or interdigitating electrodes or armatures, or the presence of a common electrode or armature, to which a plurality of electrodes or armatures are facing. In other words, in the solution proposed here, each electrode J creates the armature of a sort of "virtual capacitor", whose other armature is formed of the medium subject to detection present in the tank and where the interposed wall of the casing 16—or other insulating layer which replaces it—forms the dielectric or insulation between the armatures of this virtual capacitor, to which the appropriate dielectric or insulation constituted by the above described gel layer G is possibly added.

In practice, therefore, each electrode J produces, together with the corresponding control electronics, a kind of capacitive proximity sensor, able to detect the presence or absence of the medium, even without direct contact with the latter. This type of operation is based on the principle of detecting the electrical capacitance of a capacitor: the electrode J is the sensitive side of the capacitor and forms an armature, while the possible presence, in the vicinity, of an electrically conductive medium creates the other armature of the capacitor. In this way, the presence or absence of a medium in the proximity of each electrode J determines an electrical capacitance that the control electronics is able to detect.

In the application considered here, each electrode J is therefore able to achieve at least two different capacitive structures depending on the presence or absence of the liquid in front of it, and precisely at least

- a first capacitive structure having a first value of electrical capacitance when an electrode J faces the liquid, or when the level of the liquid in the tank is at or above the considered electrode J, and
- a second capacitive structure having a second value of electrical capacitance when an electrode J is not facing the liquid, or when the level of the liquid in the tank is below the considered electrode J.

In the preferred embodiment illustrated, as seen, the electrodes J are isolated with respect to the liquid, in that they are contained in the electrically insulating and fluid-tight casing 16: the wall of the casing 16, which the electrodes J are facing, with the possible interposed gel layer G, may therefore be treated as a sort of dielectric of the above-mentioned "virtual capacitor".

The thickness of the wall of the casing 16 facing the electrodes J, or of the insulation layer, can be indicatively comprised between 0.1 and 5 mm, preferably between 0.6 and 1 mm, even more preferably of about 0.8 mm. Furthermore, as already mentioned, the hollow casing 16 can be replaced by a direct over-molding of plastic material on the sensitive element or by a generic wall or insulating layer of the electrodes J, with the thickness of the part facing the electrodes J analogous to that indicated for the homologous wall of the casing 16.

Each electrode J is electrically connected—alone or in common, particularly in parallel with at least one other electrode J, as explained below—to a respective input of a plurality of inputs of the controller 24 belonging to the circuit arrangement 23. Preferably, between each input of the controller and a corresponding electrode J, a filter resistor is provided (two such resistors are indicated by $R_1$ and $R_n$ in FIGS. 6 and 7). The controller 24 is essentially arranged to discriminate the value of electrical capacitance associated with each electrode J, at least between the aforesaid first and second values of electrical capacitance and consequently to identify at least one liquid/air transition in the tank, indicative of the level of the medium when it is in the fluid state. In a preferred embodiment, the controller 24 carries out a sequential sampling of the values of electrical capacitance present at the inputs which are connected to the electrodes J, in order to identify the aforesaid transition.

The controller 24 is preferably a digital electronic microcontroller provided with an analogue-digital converter. By way of example, a commercial microcontroller suitable for the application proposed here has the identification code PIC16F1517, marketed by Microchip Technology Inc., Chandler, Ariz., U.S.A. It should be noted, however, that the functions of the controller 24 can be at least partly implemented by means of dedicated external circuits: for example, in a preferred embodiment, the controller 24 is formed of a microcontroller that implements an analogue-digital converter module, but in other embodiments, the controller 24 may include a microcontroller (or a microprocessor or an ASIC or FPGA integrated circuit) and an integrated circuit (either external or independent) dedicated to fulfilling the analogue-digital converter functions.

Figure 20:
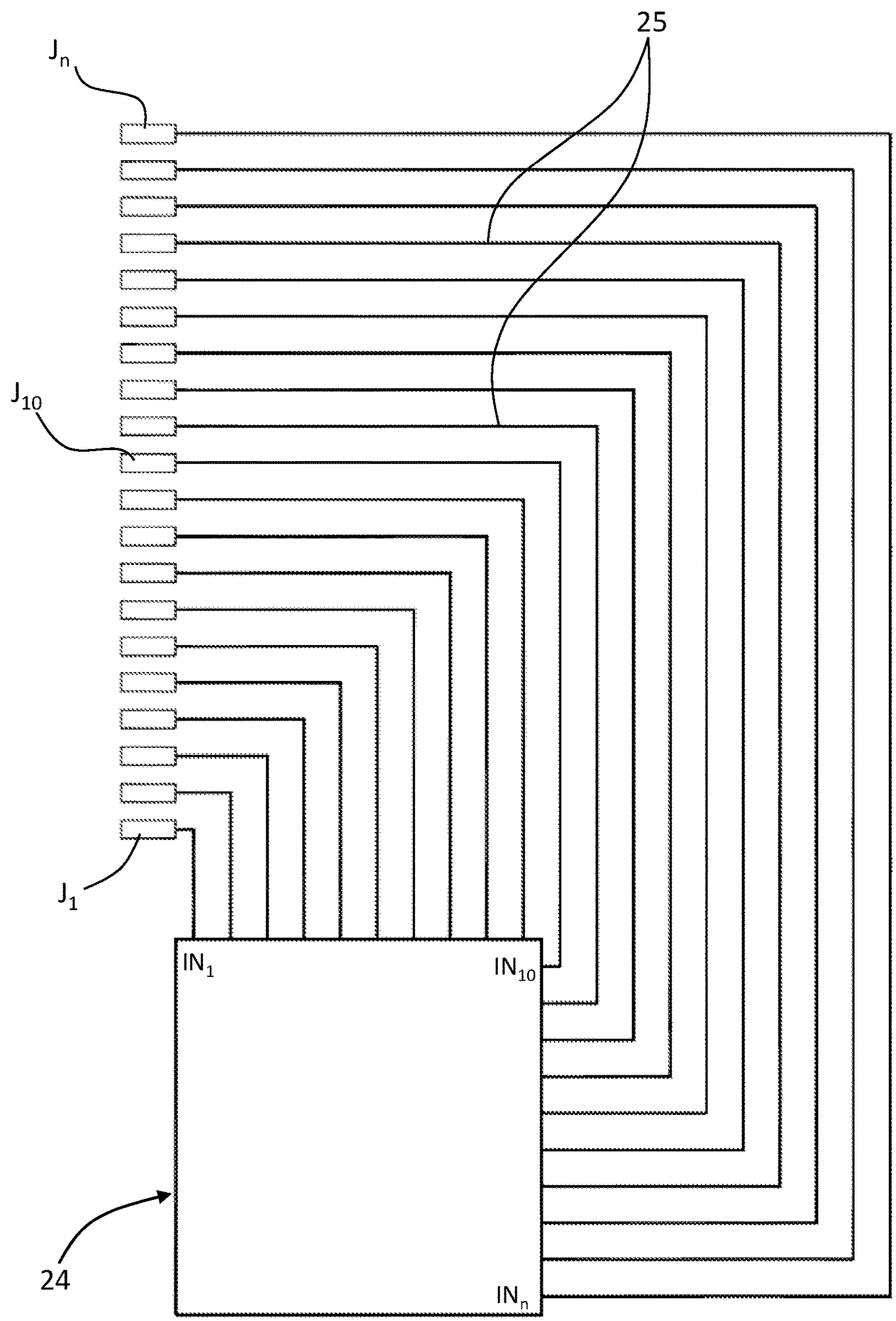
FIG. 20 is a schematic and partial representation intended to illustrate a possible configuration for connecting electrodes of a level sensor in accordance with a possible embodiment of the invention.

FIG. 20 shows, in schematic form, a controller 24 which, for exemplificative purposes only, includes "n" signal inputs IN (twenty in number here), to which are connected, through corresponding conductive tracks 25, as many electrodes J in single configuration (that is, not connected in common or in parallel to other electrodes).

In a preferred embodiment, the detection of the value of electrical capacitance at each of the inputs IN is carried out in an indirect manner, based on the measurement of a voltage. In such a case, preferably, the inputs IN of the controller 24 are analogue inputs and the controller implements or has an associated analogue-digital converter.

In a preferred embodiment, a circuit including a controllable switch and a capacitor is associated with each input IN, here also defined sampling switch and sampling capacitor. The controllable switch is switchable between a first position, in which the sampling capacitor is connected to a voltage source, and a second position, in which the same capacitor is connected to a respective electrode J or more electrodes J connected in common (in parallel). Preferably, the said voltage is a continuous voltage, for example, the supply voltage of the circuit arrangement 23. The controller 24 has means to cause switching of the controllable switch from the first position to the second position, so as to discharge the sampling capacitor in a manner proportional to the value of electrical capacitance associated with the corresponding electrode J or group of electrodes J connected in common. Furthermore, the controller 24 has means for determining the voltage at the input IN when the controllable switch is in its second position, this voltage being indicative of the electrical capacitance associated with the electrode J or group of electrodes J. The controller 24 then has comparator means, for comparing the determined voltage present at the input IN with at least one corresponding reference threshold, and thereby deducing whether the liquid is facing or not facing the electrode J or at least one of the electrodes of the group of electrodes J connected in common.

In a preferred embodiment, the scanning or sampling of the inputs IN is achieved by using a Sample and Hold circuit associated with an analogue-digital converter and the measurement of the capacitance of each electrode J or group of electrodes J takes place by comparing the measurement with respect to the intrinsic capacitance of this circuit.

Figure 21:
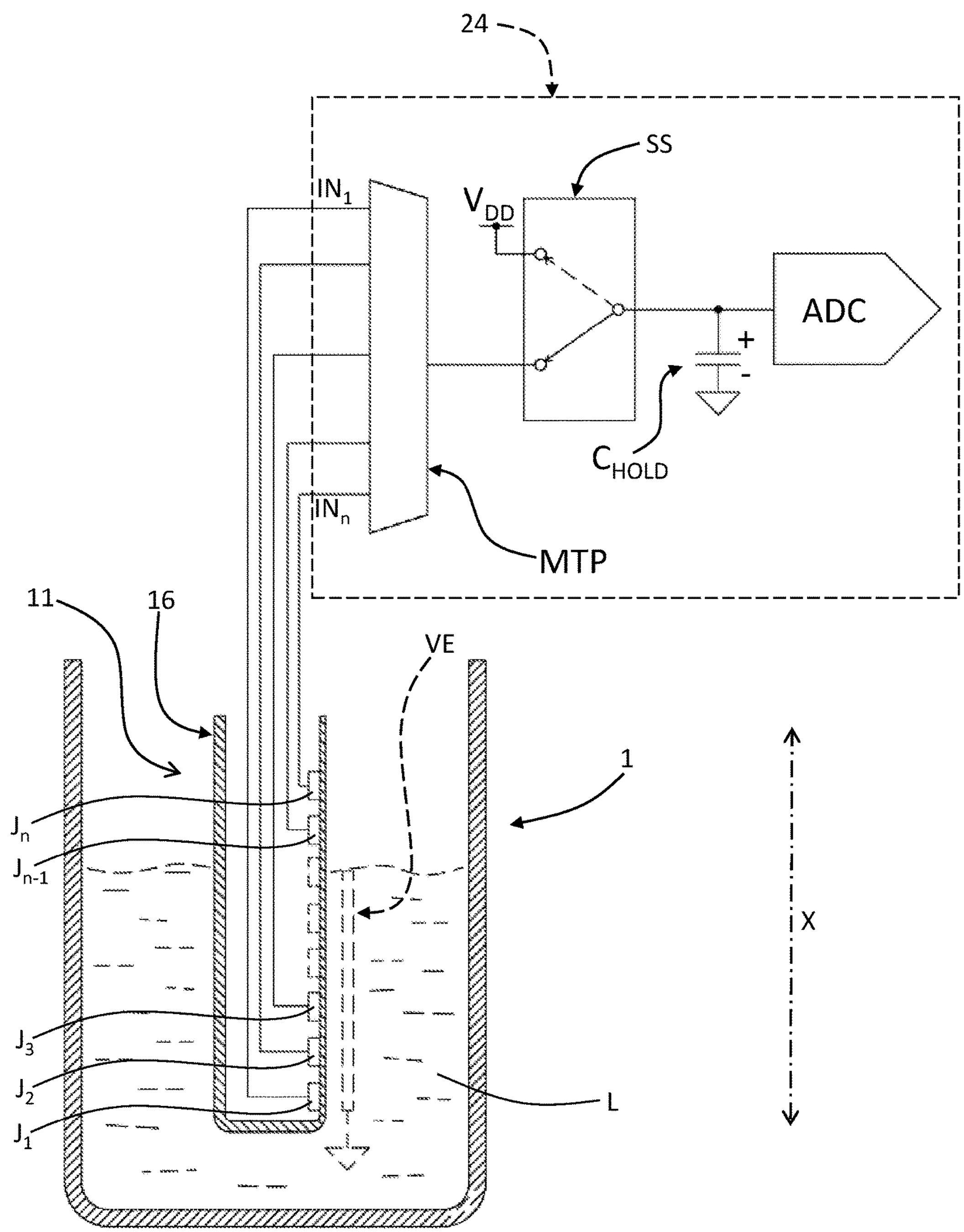
FIG. 21 is a schematic and partial representation intended to exemplify a possible circuit configuration of a level sensor according to FIG. 20.

An example of operation of a sensor according to the configuration of FIG. 20—that is, with individual electrodes connected to respective inputs of the controller 24—is shown schematically in FIG. 21. Note that in this Figure, for reasons of greater clarity, a level sensor mounted from the top is represented, that is, in the configuration of FIG. 1: the corresponding electrodes J, however, are illustrated in the same order of FIG. 20 (therefore with the lowest electrode $J_1$ and the highest electrode $J_n$).

The tank 1 is visible in FIG. 21, with the detection part 11 of the sensor inside, or the electrodes $J_1$-$J_n$ contained in the corresponding casing 16, which is at least partially immersed in the liquid AdBlue, indicated by L (the support 20 is not represented here for reasons of clarity, or considering that—in a possible embodiment—the same casing 16 could fulfill the functions of the support 20). In the illustrated example, the analogue inputs IN of the controller 24 are connected to a multiplexer MTP implemented in the controller itself, which essentially operates as an electronic diverter switch, which is associated with a sampling or "Sample and Hold" circuit, comprising a holding capacitor $C_{HOLD}$ and a sampling switch SS. The switch SS is switchable between a first position, connecting the voltage VDD (for example, the supply voltage of the controller 24) and a second position, connecting to an output of the multiplexer MTP, or a position of connection to the electrodes J.

Through the multiplexer MTP, the inputs IN, and therefore the electrodes J, are connected sequentially to the switch SS. The switch SS is cyclically switched, in a manner synchronized to the operation of the multiplexer MTP, between the first position, of charging the capacitor $C_{HOLD}$, and the second position, of connecting the same capacitor to the input IN selected at the moment by the multiplexer MTP, and therefore to the corresponding electrode J. With the switch SS in its second position, a balance of charge is essentially determined between the capacitance of the capacitor $C_{HOLD}$ and the capacitance associated with the electrode J; in other words, with this balancing charge, the capacitor $C_{HOLD}$ is discharged in a manner proportion to the capacitance of the "virtual capacitor" defined by the electrode J. Through the analogue-to-digital converter ADC, the amount of charge is then determined, or a residual voltage of the capacitor $C_{HOLD}$, which is then compared with a predefined reference threshold, in order to deduce whether the electrode J is facing the liquid L or not, or if the electrode J has assumed the first capacitive structure or configuration or the second capacitive structure or configuration previously indicated.

As explained above, when an electrode J is facing the liquid L (for example electrode $J_1$ of FIG. 21), a first value of electrical capacitance is associated therewith, while otherwise (as for the electrode $J_n$ or $J_{n-1}$ of FIG. 21), a second value of electrical capacitance is associated therewith, lower than the first value. In FIG. 21, the dashed-line block, indicated by VE, is intended to represent, in a schematic way, the "virtual" electrode or armature functionality produced by the liquid L, as explained above.

Following the aforesaid balance between the charges of the capacitor $C_{HOLD}$ and the electrode $J_1$, the voltage value at the heads of the capacitor and/or at the input $IN_1$ can essentially coincide or be higher or lower than a given threshold reference, stored in advance in the controller 24. For example, in one embodiment, the controller 24 may be programmed so that the detection at an input IN of a voltage equal to the predefined threshold, or above, is indicative of the fact that the considered electrode is not facing the liquid L (as for the electrode $J_n$), while the detection at the input IN of a voltage below the threshold is indicative of the fact that the electrode is facing the liquid (as for the electrode $J_1$).

As is evident, by carrying out the described sequential sampling, the controller 24 is able to locate the two electrodes J corresponding to the liquid/air transition in the tank 1: once the presence of the liquid/air transition is detected, the controller can deduce the liquid level based on the fact that the one of the two electrodes J, which is associated with the voltage value equal to the threshold or above, results as being the first in the air (or conversely, the electrode which is associated with the voltage value below the threshold results as being the last facing the fluid).

To this end, information representative of values in length (height) corresponding to the position of each electrode J is preferably contained in the circuit 24, or in any case the distance between the electrodes J in the direction of the measuring axis X, so as to establish or calculate the level according to the predefined unit of measure. The electronics of the sensor 10 provide the transmission or generation of signals outwards and/or towards the electrical connector of the sensor 10, representative of the level information.

Figure 22:
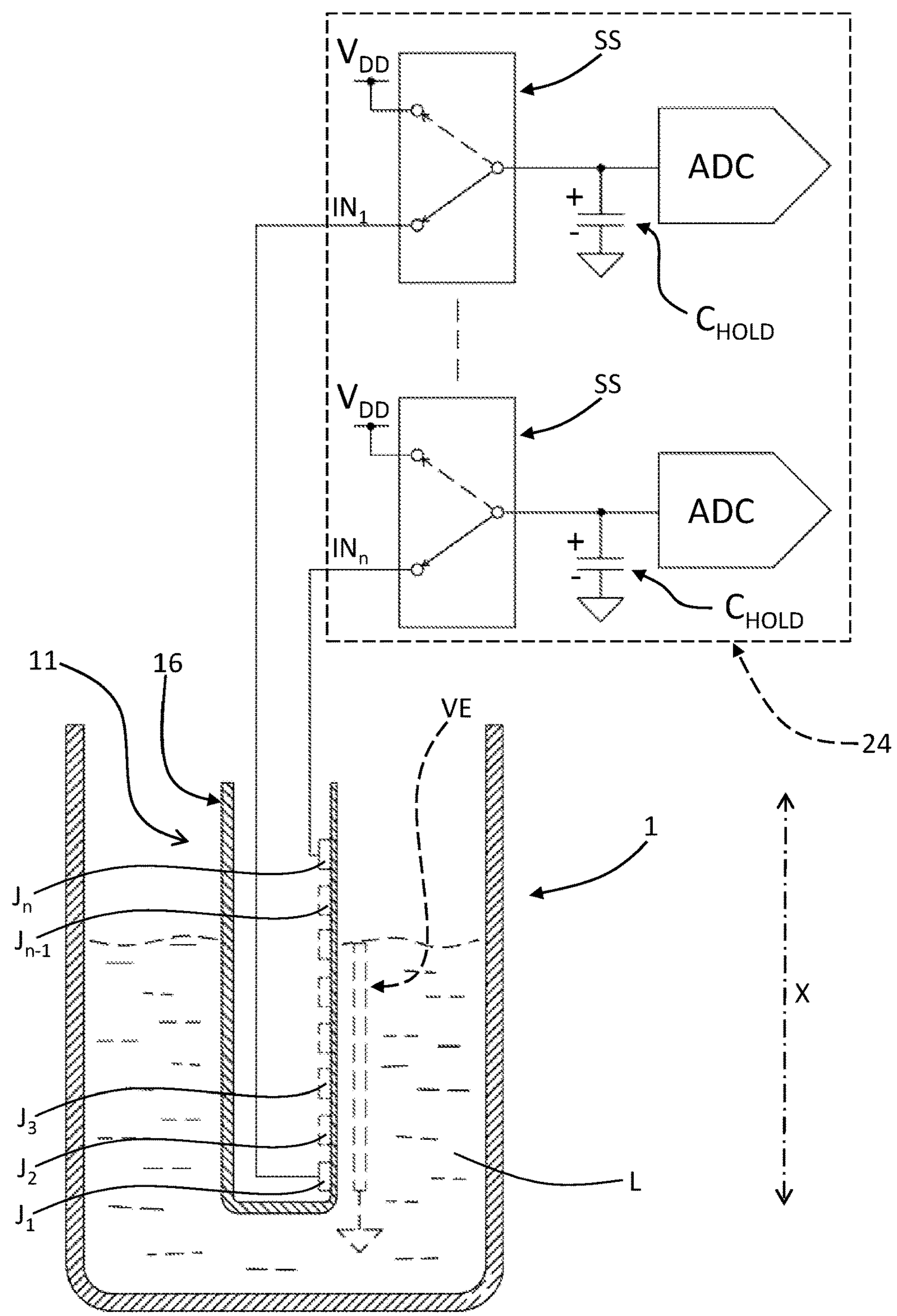
FIG. 22 is a schematic and partial representation similar to FIG. 21, designed to exemplify a possible alternative circuit configuration of a level sensor according to FIG. 20.

It will be appreciated that the functionality described with reference to FIG. 21 can also be obtained with different, but technically equivalent circuits to the one exemplified: for example, a respective circuit could be associated with each input IN of the controller 24, which carries out the functionalities of the Sample and Hold circuit described above, with a multiplexer MTP between these circuits and the converter ADC. Another possibility is to equip each input IN with a circuit carrying out the functionalities of the Sample and Hold circuit described above, directly interfaced to a converter ADC: such a case is shown schematically, for example, in FIG. 22.

Preferably, the electronics of the sensor subject of the invention is appropriately initialized and/or calibrated during production, with storage of the relevant software or program and/or of at least some of the variables (such as one or more thresholds used in detecting the level), for example dependent on the physical configuration of the sensor and installation system, represented here by the tank 1.

In one embodiment, the calibration step includes a reading of all values of the electrodes J in dry condition or in air (i.e. not facing the liquid), for the purposes of defining the first reference thresholds and/or defining an initial offset annulment, or to compensate for the parasitic capacitances due to materials, structures, thicknesses, etc. of the sensor and/or the installation system. This value is stored as a threshold reference for the detections, such as a maximum threshold in electric voltage detectable by the capacitor $C_{HOLD}$ and/or by the circuit ADC, this threshold value being able to be subsequently varied as a consequence of measurements made during the useful life of the sensor, for example by means of a dedicated reference electrode. This calibration operation is preferably carried out only once in the production line, but for some applications where the tank presents critical geometry, which may weigh upon the measurement of the raw data of the electrodes J (such as very narrow volumes and the presence of metal material), it is possible to use this calibration or auto-calibration directly on the installed sensor 10, in order to have an optimum calibration in the actual system and/or to cancel all the possible noise effects due to the external environment.

The principle of operation described is, to a certain extent, dependent on the temperature and aging of the system, if observed in an absolute way. For this reason, in a preferred embodiment, the controller 24 is programmed to carry out a measurement of a differential type, preferably employing at least one reference electrode for the purpose. Given that the effect of the temperature is represented by an offset on the measurement of the determined voltage value at an input IN of the controller 24, by carrying out a differential measurement between a sensing electrode and a reference electrode, it is possible to obtain both the measurement on the detecting electrode, and to subtract the common mode effect present on the detecting electrodes, and then to cancel any thermal and/or structural drift produced by temperature change and/or aging; the aforementioned thermal drift can also be compensated by means of a temperature sensor, for example of the type of those indicated by 26 and 27. According to this embodiment, therefore, the determined voltage value, used for comparison with the at least one reference threshold, is preferably a differential value.

The aforesaid reference electrode is preferably the lowest electrode within the tank 1 and, therefore, referring to the examples illustrated thus far, the electrode $J_1$. It is also possible to provide even more reference electrodes (for example, the first three electrodes J starting from the bottom), usable for carrying out the differential measurement, as well as for programming the controller 24 to choose, in turn, any one of the electrodes $J_1$-$J_n$ as the reference electrode for the purposes of carrying out the differential measurement (the controller 24 is, in fact, able to identify an electrode facing or not facing the liquid, by reason of the fact that the electrical capacitance is different in the two conditions and due to the presence of the aforementioned upper threshold).

In an embodiment of this type, the controller 24 carries out a scan of all the electrodes J with acquisition of the corresponding voltage raw data, for verifying the presence of the liquid: at this step, the controller 24 calculates the difference between the raw data of each detecting electrode and the raw data of the reference electrode $J_1$, obtaining a relative measure. This difference is compared with at least one minimum threshold defined in the design stage: in one possible embodiment, if at least one of the differences calculated between each detecting electrode $J_2$-$J_n$ and the reference electrode $J_1$ is below the minimum threshold, then it means that the detecting electrode in question is at least partially facing the liquid L; in the opposite case, the electrode in question is in the air, or at a height above the level of the liquid L.

As already indicated, investigating the level is essentially based on the identification, by the controller 24, of the two detecting electrodes corresponding to the transition between liquid and air. The evaluation is carried out by comparing the relative information (the differential measurement) with predefined thresholds for each electrode and defined in the design stage (possibly replaceable with defined thresholds and stored following testing with liquid in the productive stage), in order to deduce whether an electrode faces the liquid or not. Following the carried out scan, the controller can identify two adjacent detecting electrodes, of which one is facing the liquid and the other is not, that is the position (height) of the liquid/air transition in the tank 1.

In one embodiment, in itself inventive, the electronic circuit of the sensor 10 is subject to a calibration or configuration according to the type and/or conductivity of the medium subject to level detection, especially considering that in the case of less conductive means, or resistive, a kind of electrical resistance virtually connected in series to the measurement capacitor would be determine, which resistance could determine an increase in the time required to reach the final threshold value (such as an increase in the charging time of the "virtual capacitor" to which an electrode J belongs and/or an increase in the discharge time of the capacitor $C_{HOLD}$); in this context, the aforementioned calibration can be, for example, envisaged to take account of any delays in the sample measurement, and to avoid false readings of values not yet well stabilized.

In one embodiment in itself inventive, the electronic circuit of the sensor 10 is configured to detect the charging curve of the "virtual capacitor" corresponding to the measuring electrode J and/or for detecting the discharge curve of a sampling capacitor, such as the capacitor $C_{HOLD}$, where the charging and/or discharge curve is variable, at least in proportion to the characteristics of electrical conductivity and/or impedance of the medium subject to measurement, in order to be able to determine characteristics of the medium subject to detection. The electronic circuit may employ the information thus acquired for the purposes of carrying out one or more detecting operations, processing operations, comparison operations, storing operations, compensation operations, and signaling operations. To this end, structural and/or circuital elements are usable, at least partly analogous to those previously described.

As mentioned, in a particularly advantageous embodiment, the detecting electrodes comprise at least first detecting electrodes, connected to respective inputs IN of the controller 24, and second detecting electrodes, which are electrically connected in common or in parallel to the first detecting electrodes, the definition of connection in parallel also referring to the connection in parallel between the "virtual capacitors" defined by the electrodes J which are mutually connected in common with respect to a respective input IN.

Figure 23:
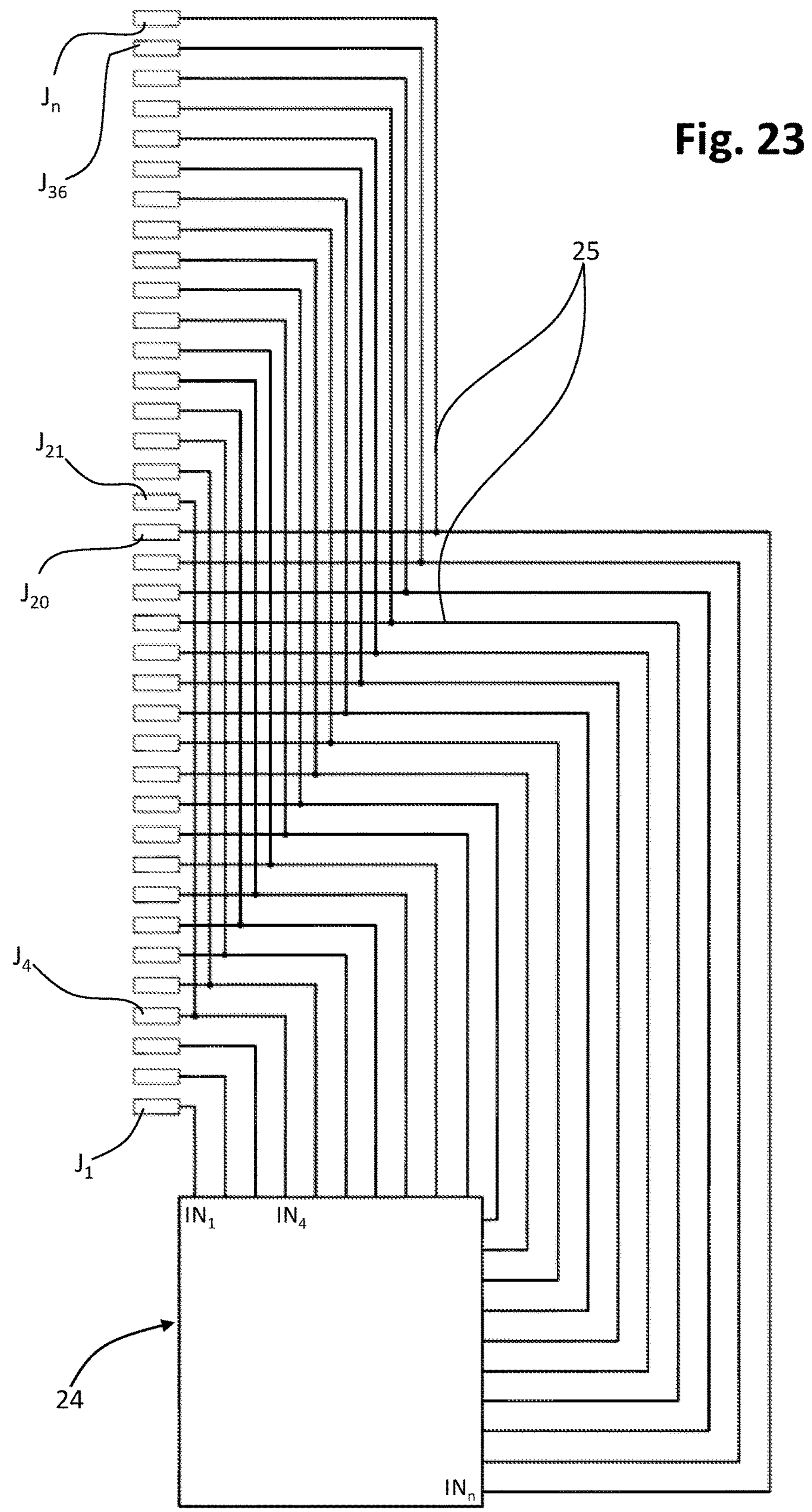
FIGS. 23 and 24 are schematic representations designed to illustrate further possible configurations for connecting electrodes of level sensors according to possible alternative embodiments of the invention.

An example of this type is illustrated schematically in FIG. 23, where the aforesaid first electrodes go from the electrode $J_4$ to the electrode $J_{20}$, while the second electrodes go from the electrode $J_{21}$ to the electrode $J_n$; in this example, the electrodes $J_1$-$J_3$ can be reference electrodes. In the configuration of FIG. 23, a first sub-array (or module or block or group) of first electrodes can be essentially identified, which go from the electrode $J_4$ to the electrode $J_{20}$, and a second sub-array of second electrodes, which go from the electrode $J_{21}$ to the electrode $J_n$, which are essentially connected together in common or in parallel; the number of sub-arrays of electrodes can be increased in order to obtain shorter or longer level sensors, or in order to allow different level measurements.

In one embodiment of this type, the comparator means implemented in the controller 24 are arranged to compare the determined voltage at the input IN corresponding to two electrodes connected in common (for example, the electrodes $J_4$ and $J_{21}$ in parallel) with at least two corresponding reference thresholds, in order to deduce whether the liquid is facing or not facing the first detecting electrode (the electrode $J_4$) and/or the corresponding second detecting electrode (the electrode $J_{21}$). The measurement can be carried out in the manner described previously. Preferably, in this case as well, the measurement is carried out by acquiring the raw data at the input IN to which the two detecting electrodes are connected in common, and by then referencing this value with respect to a reference electrode, i.e. the electrode $J_1$, in order to pass from an absolute measurement to a differential measurement to cancel any effect of common mode error due to the temperature and/or aging of the level sensor, as previously described.

In one embodiment, the value obtained by the differential measurement is compared with a number of thresholds equal to the number of electrodes connected in common, increased by 1. Referring to the example considered here of two electrodes J in parallel, therefore, the differential value is compared with three distinct thresholds defined in the design or in the production stage: a value equal to a first threshold or within a determined range (for example +/−40%) indicates that both electrodes are not facing the liquid, a value equal to a second threshold or within a determined range (for example +/−40%) indicates that one of the electrodes (identified according to its physical location) faces the liquid and the other electrode does not, a value equal to a third threshold or within a determined range (for example +/−40%) finally indicates that both electrodes are facing the fluid.

In a different embodiment, a more simplified analytical logic is provided, according to which the value obtained by the differential measurement is compared with a number of thresholds equal to the number of electrodes connected in common. Referring again to the example considered here of two electrodes J in parallel, then, the differential value is compared with only two thresholds: a value above a first threshold indicates that both electrodes are not facing the liquid, a value between the two thresholds indicates that one of the electrodes (identified according to its physical location) faces the liquid and the other electrode does not, a value below the second threshold indicates, finally, that both electrodes are facing the fluid.

Of course, according to the same principle described above, more than two electrodes connected in common can be provided, or more sub-arrays with the respective electrodes in parallel, in which case the number of reference thresholds for each input IN will be equal to the number of electrodes of each parallel increased by 1, or equal to the number of electrodes of each parallel, depending on the analytical approach implemented.

Figure 24:
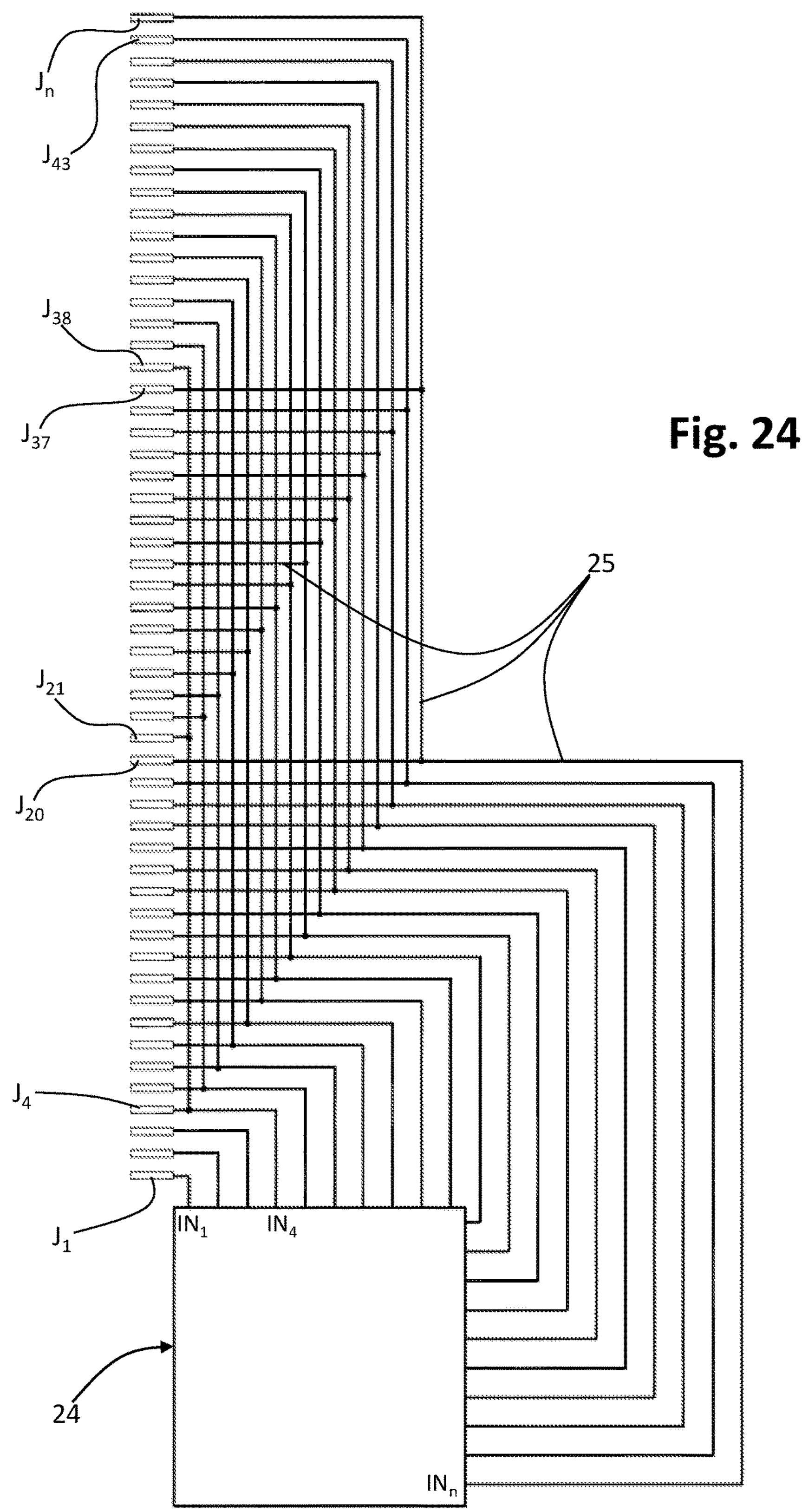

For example, in FIG. 24 the case of first, second and third detecting electrodes connected in common or in parallel is illustrated. The first electrodes go from the electrode $J_4$ to the electrode $J_{20}$, the second electrodes go from the electrode $J_{21}$ to the electrode $J_{37}$ and the third electrodes go from the electrode $J_{38}$ to the electrode $J_n$; in this example, the electrodes $J_1$-$J_3$ can be reference electrodes. In the example of FIG. 24 it is therefore possible to identify three sub-arrays of electrodes or "virtual capacitors", with the electrodes of one sub-array ($J_4$-$J_{20}$) that are essentially connected in common or in parallel with homologous electrodes of the other sub-arrays ($J_{21}$-$J_{37}$ and $J_{38}$-$J_n$).

In one embodiment of this type, the comparator means implemented in the controller 24 are arranged to compare the determined voltage at the input IN corresponding to three electrodes in parallel (for example the electrodes $J_4$, $J_{21}$ and $J_{37}$) with three corresponding reference thresholds, in order to deduce whether the liquid is facing or not facing the first detecting electrode (the electrode $J_4$) and/or the corresponding second detecting electrode (the electrode $J_{21}$) and/or the third detecting electrode (the electrode $J_{37}$). An example of operation of an arrangement of the type illustrated in FIG. 24 is described below with reference to FIGS. 25 and 26.

Figure 25:
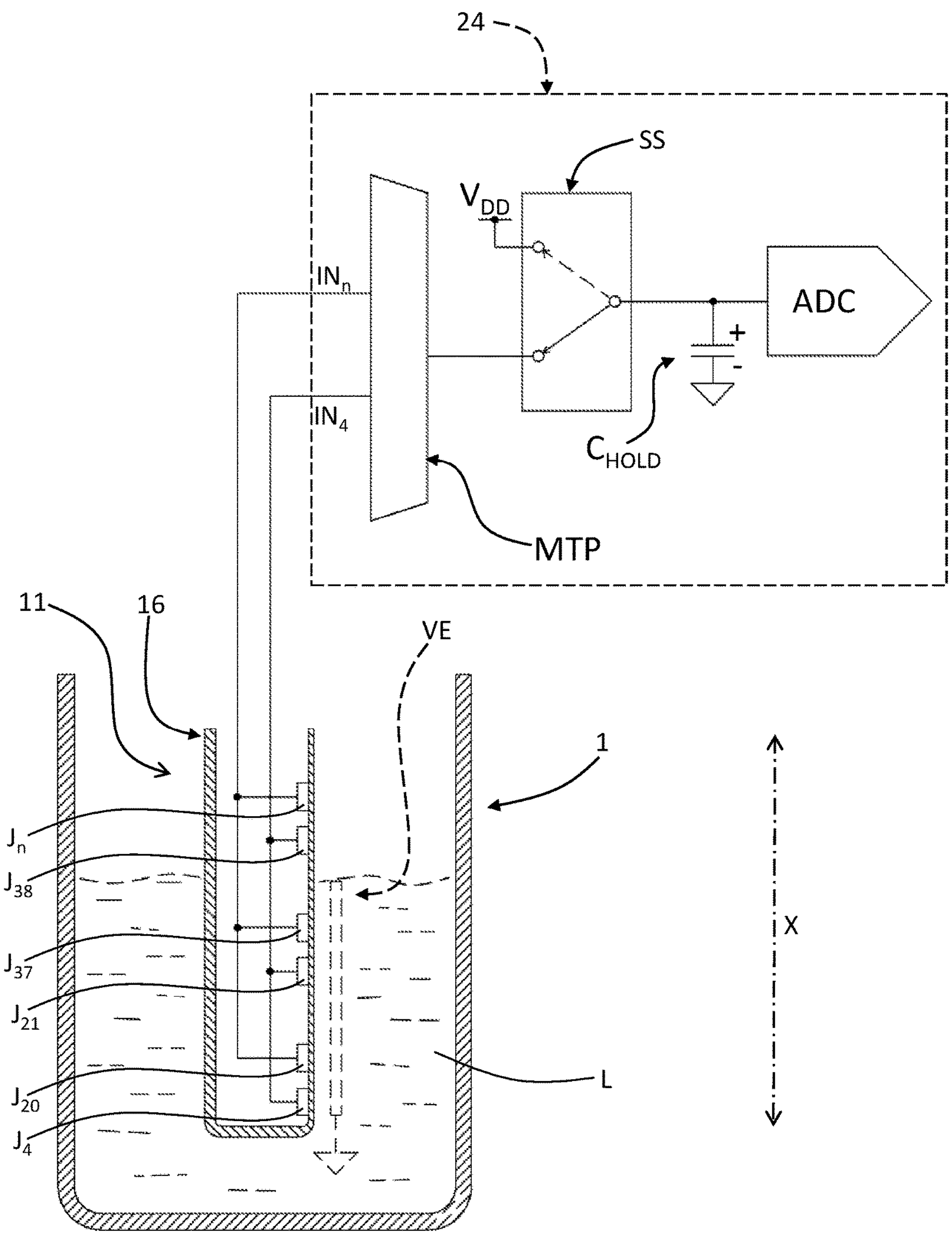
FIG. 25 is a schematic and partial representation designed to exemplify a possible circuit configuration of a level sensor according to FIG. 24.

FIG. 25 is a schematic representation similar to that of FIG. 21, in which only two inputs $IN_4$ and $IN_n$ of the controller 24 are highlighted (the representation of the reference electrode $J_1$ is omitted here for clarity). As for the case of FIG. 21, the controller 24 carries out sequential sampling of its analogue inputs IN, with corresponding differential measurement for each of them and corresponding comparison with the three predefined thresholds for electrodes J facing the liquid L and/or the predefined threshold for "dry" electrodes J, i.e., not facing the liquid L.

Figure 26:
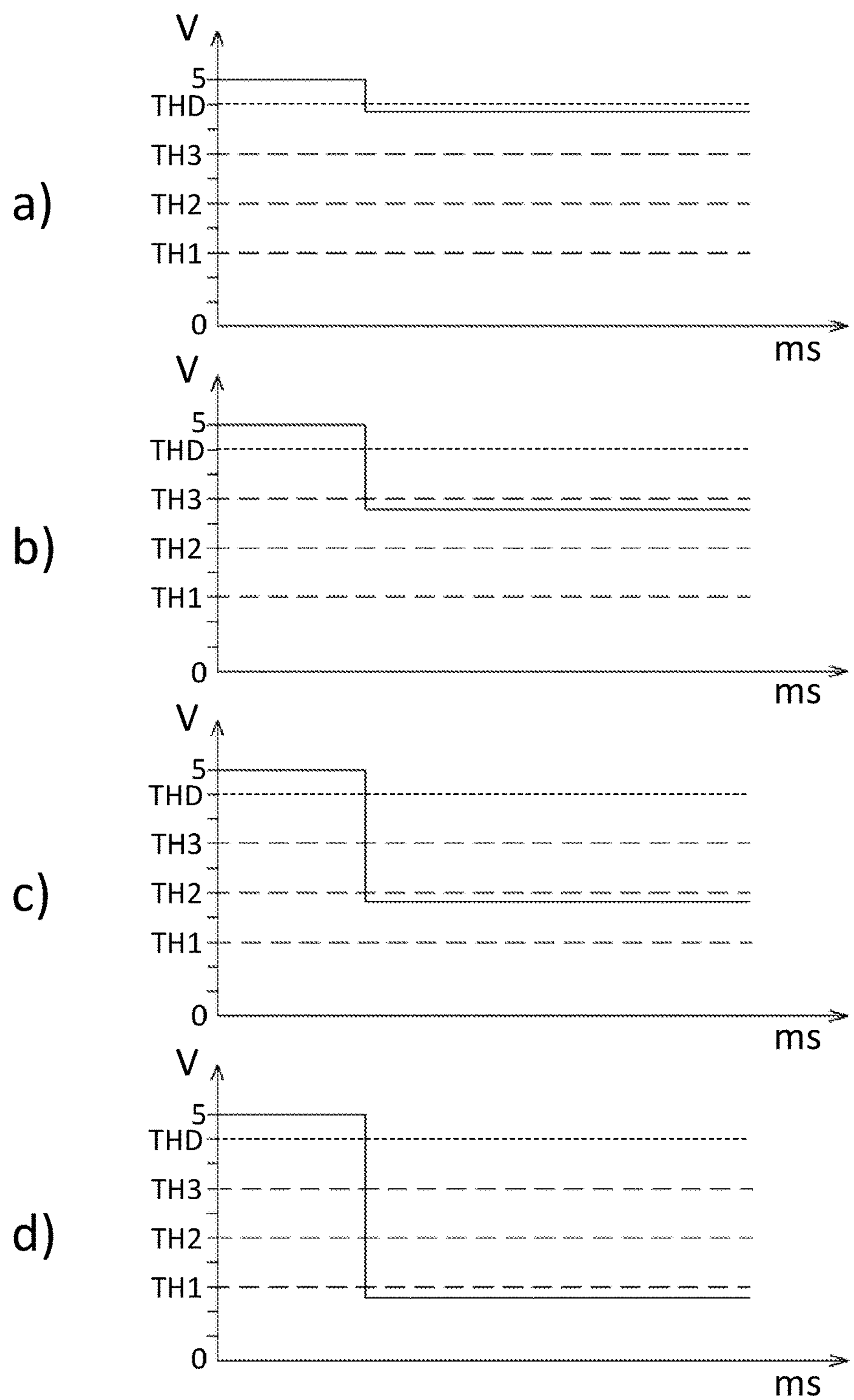
FIG. 26 is a schematic graphical representation, designed to exemplify a possible principle of interpretation of signals or electrical values used in possible embodiments of the invention.

The principle of measurement adopted for the various inputs IN, for example, the input $IN_4$, is exemplified in schematic and graphical form in FIG. 26. It can be assumed that the initial voltage of 5 V, indicated in the graphs, corresponds to the voltage $V_{DD}$ of FIG. 25. TH1, TH2 and TH3 indicate three predefined threshold values for the input $IN_4$, or a maximum threshold, a minimum threshold and an intermediate threshold, respectively, for the condition of electrodes facing the liquid.

The graph in part a) of FIG. 26 shows the condition that occurs in the case where none of the three electrodes $J_4$, $J_{21}$ and $J_{38}$ is facing the fluid, following the switching of the switch SS of FIG. 25 into its position in which the capacitor $C_{HOLD}$ is connected to the corresponding group of detecting electrodes $J_4$, $J_{21}$ and $J_{38}$. In the Figure, the falling edge of the voltage is meant to represent the decrease of the voltage value due to the differential measurement carried out, in the modalities previously described, and/or to the fact that, even if is not facing the liquid L, a minimal electrical capacitance is anyway still associated with the three electrodes in question, due to the structure of the device. The fall in the voltage in the graph in part a) of FIG. 26 is also detected in reference to a determined "dry" threshold value, indicated by THD, higher than the maximum threshold value TH3, this threshold value THD also being usable for the purpose of discrimination with respect to the three detection thresholds TH1, TH2 and TH3. The fall of the voltage in the graph a) remains within a determined neighborhood (for example the already mentioned +/−40%) of the THD threshold, and anyway above the maximum threshold TH3: the controller 24 therefore deduces the absence of liquid in front of the electrodes $J_4$, $J_{21}$ and $J_{38}$.

The graph in part b) of FIG. 26 instead shows the condition which occurs in the case where one of the electrodes $J_4$, $J_{21}$ and $J_{38}$ is facing the liquid L. In this case the decrease of the voltage value is greater than the previous case: in addition to the differential measurement, in fact, the total electrical capacitance associated with the three electrodes is greater than the previous case, since one of them is facing the liquid L. The voltage value is now within the determined neighborhood of the threshold TH3, and from this the controller 24 deduces the presence of liquid in front of just one of the electrodes, i.e., the lowest electrode of the three (the physical position of the electrodes being known to the controller).

The graph in part c) of FIG. 26 instead shows the condition corresponding to that of FIG. 25, or the condition in which two of the electrodes $J_4$, $J_{21}$ and $J_{38}$ are facing the liquid L. The decrease of voltage is now greater than in the case of part b) of FIG. 26 because, in addition to the differential measure, in the condition in question the total electrical capacitance associated with the three electrodes is further increased compared to the previous case. The voltage value is now within a determined neighborhood of the threshold TH2: the controller 24 therefore deduces the presence of liquid in front of the electrodes $J_{20}$ and $J_{37}$ and the absence of liquid in front of the remaining electrode $J_n$, i.e., the highest electrode of the three. This discrimination is carried out also considering that, in the case of freezing conditions or partial solidification of the liquid, it is possible to combine other measurements in order to better discriminate this condition, such as a verification and comparison with the state of adjacent electrodes and/or temperature detection. Finally, the graph in part d) of FIG. 26 instead shows the condition in which all three electrodes $J_4$, $J_{21}$ and $J_{38}$, are facing the liquid L. The decrease of voltage is evidently greater with respect to the case of part c) of FIG. 26 because, in addition to the differential measure, in the condition in question, the total electrical capacitance associated with the three electrodes is at a maximum. The voltage value is now within the determined neighborhood of the threshold TH1, from which the controller 24 deduces the presence of liquid in front of the three electrodes $J_4$, $J_{21}$ and $J_{38}$.

As explained above, the same results are obtainable using a simplified logic, i.e., by comparing the voltage value with the three detection thresholds TH1, TH2 and TH3 alone, as follows:

- part a) of FIG. 26: with the voltage value that remains above the threshold TH3, the controller 24 deduces the absence of liquid in front of the electrodes $J_4$, $J_{21}$ and $J_{38}$;
- part b) of FIG. 26: with the voltage value that is between the threshold TH3 and the threshold TH2, the controller 24 deduces the presence of liquid in front of the lowest electrode of the three;
- part c) of FIG. 26: with the voltage value that is between the threshold TH2 and the threshold TH1, the controller 24 deduces the presence of liquid in front of the electrodes $J_{20}$ and $J_{37}$ and the absence of liquid in front of the remaining electrode Jn; and
- part d) of FIG. 26: with the voltage value that decreases below the threshold TH1, the controller 24 deduces the presence of liquid in front of the three electrodes $J_4$, $J_{21}$ and $J_{38}$.

By scanning the inputs IN with one of the modes exemplified above, the controller 24 is able to identify the liquid/air transition. In the specific case of FIG. 25, therefore, the controller 24 may deduce the presence of a liquid/air transition between the electrodes $J_{37}$ and $J_{38}$, thereby identifying the liquid level in the tank 1.

From the above description it is clear how the type of solution proposed is extremely flexible in relation to the possible lengths required for the level sensor. In other words, with a given controller 24, and with one and the same to the number of its analogue inputs IN (or with a slightly higher number of inputs IN, as described hereinafter) it is possible to produce level sensors of different lengths, by providing the use of individual electrodes J for detection, or two electrodes in parallel J, or even three electrodes J in parallel, and so on.

For example, by positioning twenty individual electrodes J of 2 mm in height, placed at a 2 mm distance from each other, a 78 mm area is achieved that is sensitive for measuring the level ((20 electrodes+19 spaces therebetween)*2 mm). When it is necessary to increase the length of the sensitive area (measurement of higher levels), while maintaining the same measurement resolution, it is possible to use two electrodes in parallel, or three, even maintaining the same controller 24.

Preferably, in the presence of the first detecting electrodes connected in common to additional detecting electrodes, it is preferable that the physical locations of the various sub-arrays of electrodes are as far apart as possible from each other, in order to increase the signal difference, and thus the quality of the level information. For this reason, in a preferred embodiment, if a number of groups of detecting electrodes connected in common are provided, the electrodes of each group form respective sub-arrays arranged in sequence along the detecting axis of the sensor, as is apparent, for example, in FIGS. 23 and 24. In general, and referring, for example, to FIG. 24, the rule can be applied that, given a number y (for example 17 electrodes) of first electrodes ($J_4$-$J_{20}$) in parallel to second electrodes ($J_{21}$-$J_{37}$), between each first electrode and the corresponding second electrode, y−1 electrodes will be interposed (for example, 16 electrodes).

Thanks to the constructive typology described, it is also possible to have different sensitivities of level readings: this can be obtained, in the stage of producing the part 20*a* of the support of corresponding electrodes J, by positioning the electrodes themselves with a center-to-center distance equal to the desired resolution. It is also possible to provide at least two differentiated measuring resolutions on the sensitive portion 20*b* of the sensor, particularly at least one higher measuring resolution and one lower measuring resolution, in a low area and in a high area of the portion 20*b*, or vice versa. In this case, the electrodes in the low area of the portion 20*b* will be closer to each other with respect to the electrodes present in the high area, or vice versa. The minimum distance between two electrodes can be, for example, equal to 1 mm. It is then clear that the dimensions of the electrodes define the amount of electrical capacitance measurable by the control electronics, so that an electrode of greater magnitude will thus provide a greater dynamic or value.

The electrodes J are preferably (but not necessarily) equal to each other and may, for example, be produced with dimensions of 20 mm (length)×2 mm (height) and placed at a distance of 2 mm from each other; for level sensors shorter than 100 mm—or if it is required to increase the resolution in an area of the sensitive portion of the sensor—it is possible to decrease the size of the electrodes, and therefore also decrease the distance between them, in order to obtain a greater measuring resolution: in these cases, the electrodes may, for example, have dimensions of 15 mm (length)×1 mm (height) and be placed with 1 mm between them. To maximize the measuring dynamic corresponding to the liquid, for example with respect to the liquid AdBlue considered here (or another solution with urea or other reducing agent), it is also preferable to dimension the electrodes, for any value of their length, so that the height of an electrode is equal to the distance between two contiguous electrodes.

Figure 27:
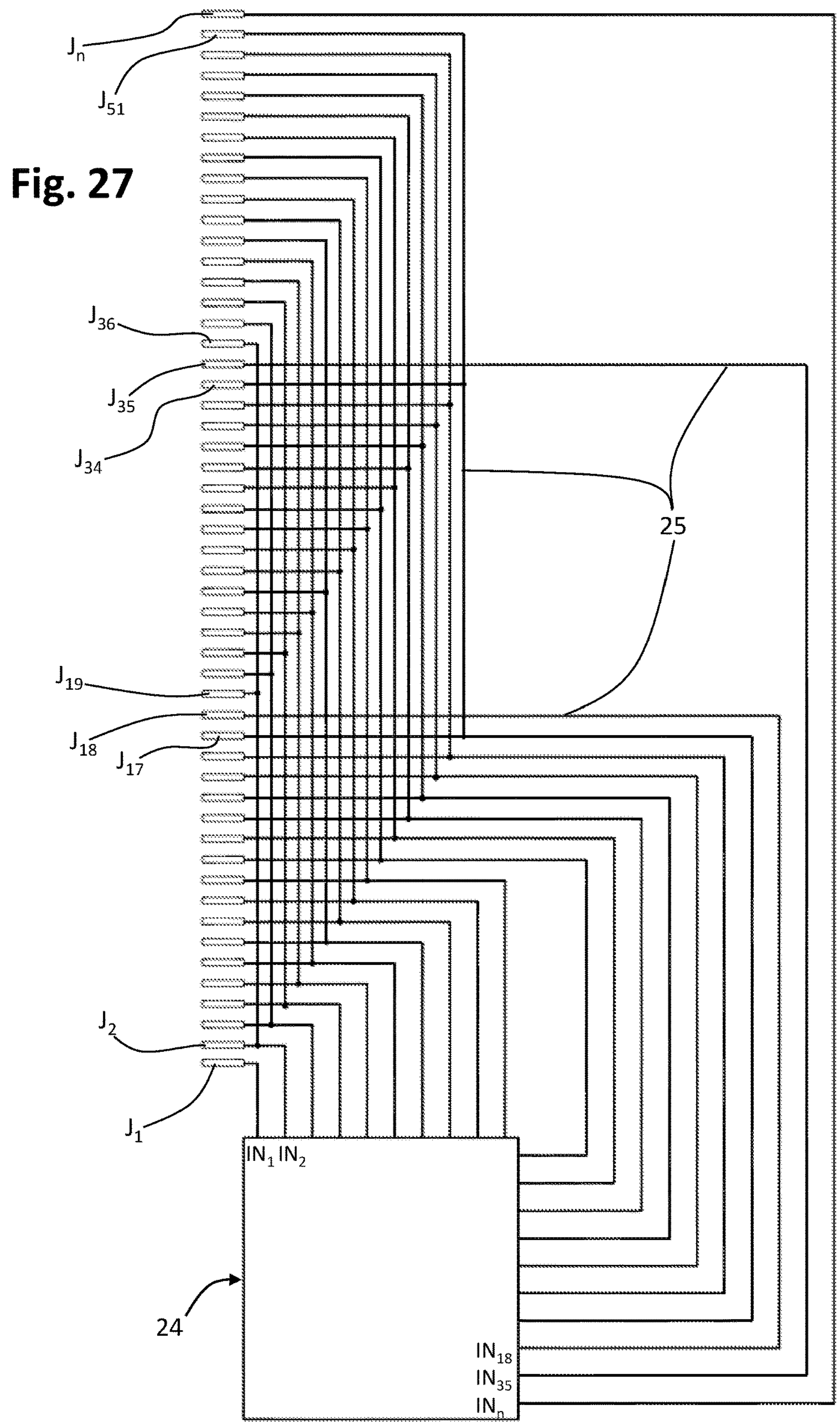
FIGS. 27 and 28 are schematic representations similar to those of FIGS. 20, 23 and 24, designed to illustrate further possible configurations for connecting electrodes of level sensors according to possible alternative embodiments of the invention.
Figure 28:
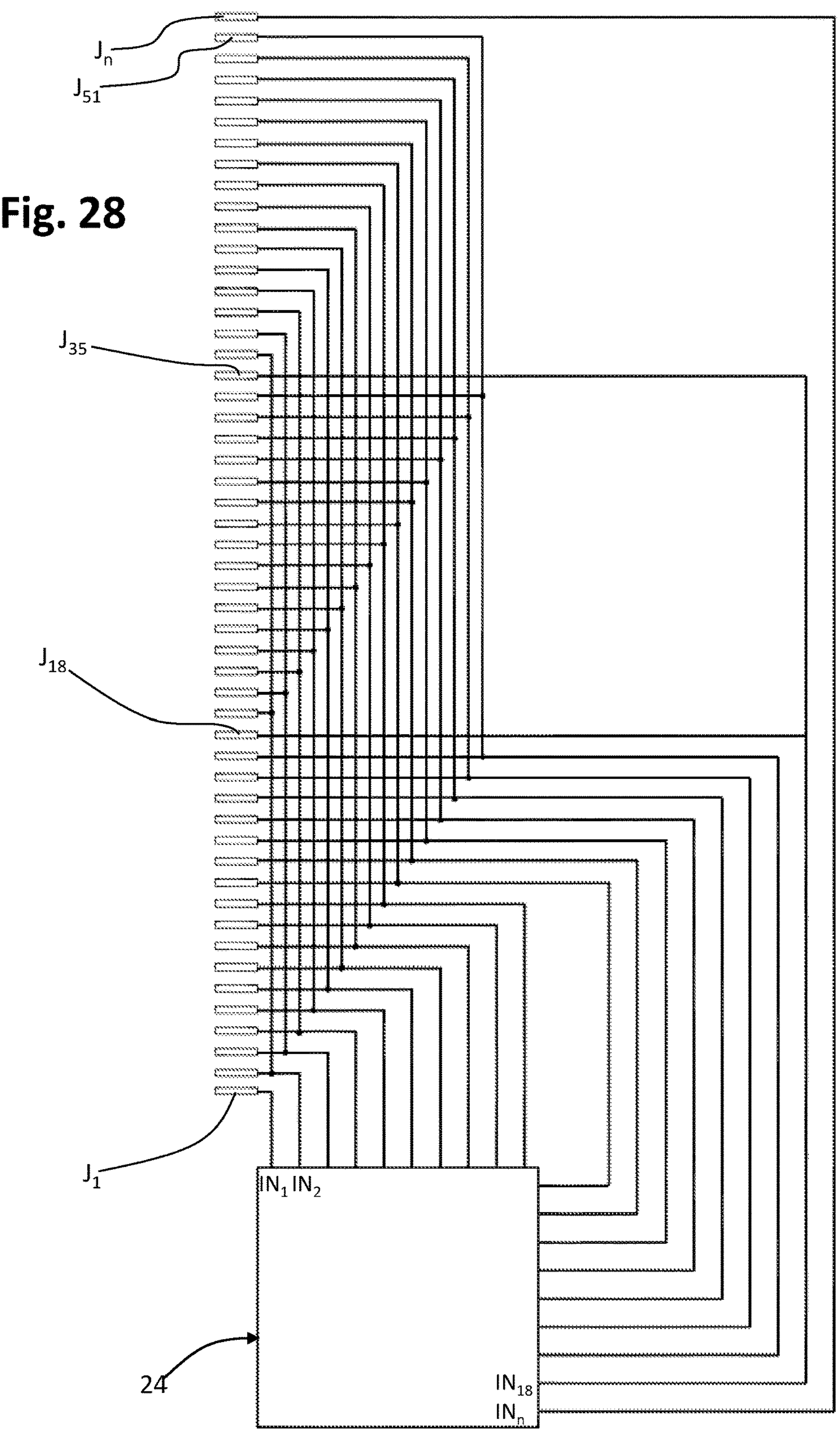

FIGS. 27 and 28 represent, with views similar to that of FIG. 24, further possible arrangements that include three groups of electrodes J in parallel: In the case of FIG. 27, the two illustrated end electrodes of the array, or the electrodes $J_1$ and $J_n$, are not connected in parallel with the other electrodes, and constitute reference electrodes, respectively of the condition of presence and absence of liquid, or vice versa, whose function is preferably programmable or predeterminable, for example in order to allow mounting of the sensor 10 in the tank 1 in the two conditions of FIGS. 1 and 2.

FIG. 27 illustrates a configuration, in part similar to that of FIG. 24, where the array of electrodes includes three sub-arrays of the first, second and third detecting electrodes connected in common (in parallel) between each other, the sub-arrays being, however, separate from the individual electrodes. The first electrodes go from the electrode $J_2$ to the electrode $J_{17}$, the second electrodes go from the electrode $J_{19}$ to the electrode $J_{34}$ and the third electrodes go from the electrode $J_{36}$ to the electrode $J_{51}$. In this example, the intermediate electrodes $J_{18}$ and $J_{35}$ are, instead, independent and interposed between the aforesaid three sub-arrays of electrodes: in particular, the single electrode $J_{18}$ is interposed between the first sub-array ($J_2$-$J_{17}$) and the second sub-array ($J_{19}$-$J_{34}$), while the single electrode $J_{35}$ is interposed between the said second sub-array and the third sub-array ($J_{36}$-$J_{51}$).

The intermediate electrodes $J_{18}$ and $J_{35}$ allow a clearer distinction between the sub-arrays of electrodes connected in common, in particular in order to detect particular conditions or states of the liquid or other means subject to detection (such as a state of partial solidification or freezing of the liquid or medium), particularly a more precise and/or clear distinction in the detection of "liquid-air or gas" and/or "liquid-air or gas-solid or ice" transitions. To this end, it is considered that the interposed electrodes $J_{18}$ and $J_{35}$ allow more rapid determination of which and/or how many sub-arrays, or parts of them, are facing the medium (or conversely, not facing), and can then identify, more rapidly, areas of uncertainty in which more accurate measurements can be carried out, or by detecting the transition zones between two adjacent electrodes, for example, for detecting the "liquid-to-air" transition zone as previously indicated.

The presence of the independent intermediate electrodes is also useful to improve discrimination of values in relation to the above cited reference thresholds (such as the TH1, TH2, TH3 and/or the "dry" thresholds), in particular in the case of a high number of sub-arrays of electrodes in common (in parallel): in the case of many sub-arrays, in fact, many reference thresholds will be present, which are closer together; for example, in the case where it is preferable, for cost reasons, to use an analogue-to-digital converter ADC with lower resolution (for example, 8 bits instead of 10 or 12 bits); the presence of a said independent electrode $J_{18}$, $J_{35}$ allows a clearer and/or more certain detection, analogously to that described in reference to the graph b) of FIG. 26, where only the threshold TH3 is considered.

FIG. 28 is essentially similar to FIG. 27, distinguished by the fact that the intermediate electrodes $J_{18}$ and $J_{35}$ are not individual, but in parallel to each other and connected to the same input IN. A configuration of this type can be useful for limiting the number of connections to the intermediate electrodes provided, while ensuring a good distinction of two thresholds (such as thresholds TH1 and TH2) associated with the same input IN.

With reference to the exemplary configurations described in FIGS. 27 and 28, and considering a greater number of sub-arrays or groups of electrodes connected in common (for example, equal to or greater than five sub-arrays), more intermediate electrodes, can then be provided, individually connected or linked together in pairs in parallel.

Figure 29:
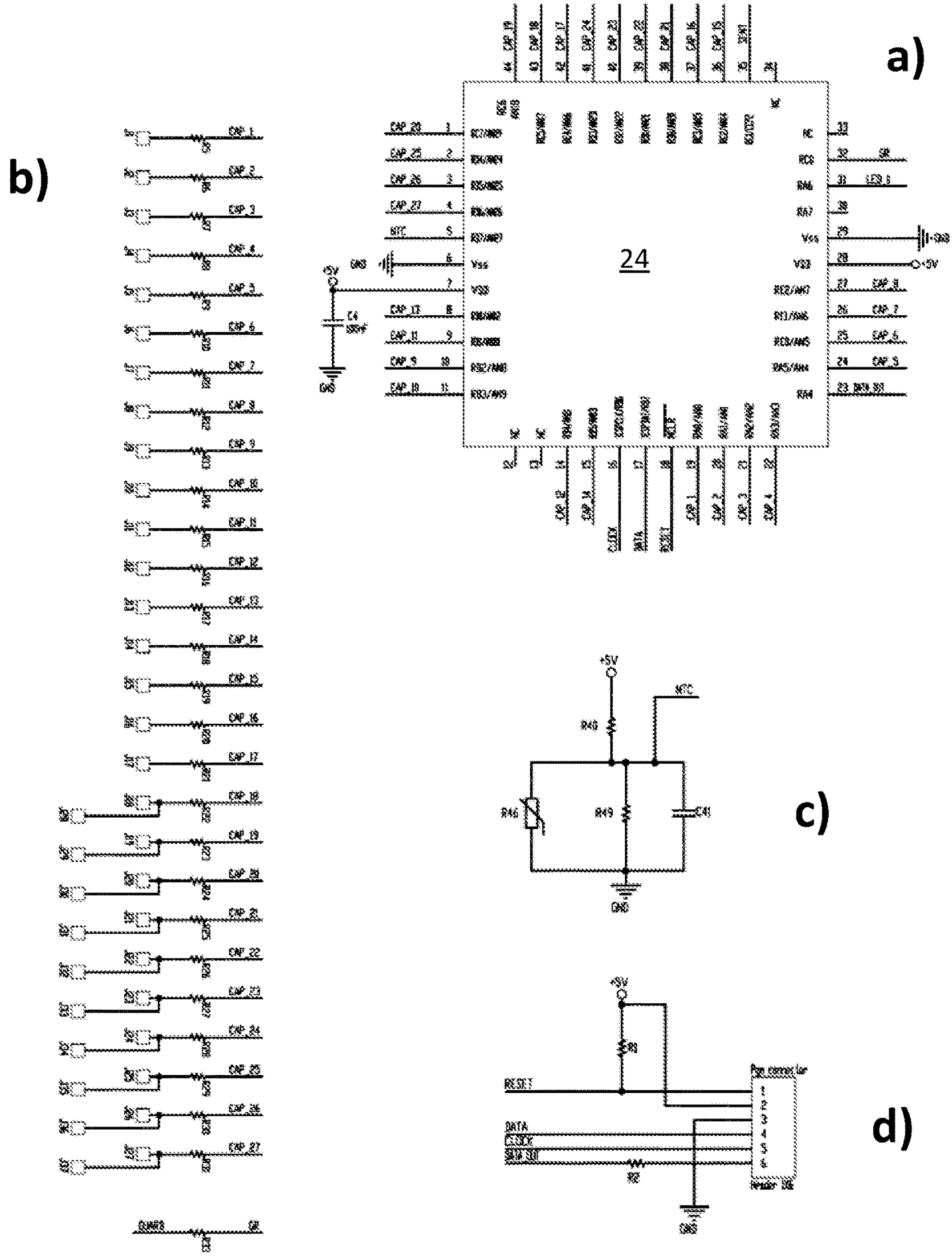
FIG. 29 is a schematic representation of some circuit elements of a level sensor in accordance with a possible embodiment of the invention.

FIG. 29 illustrates some of the circuit components used in a possible practical embodiment of the invention. Part a) of the Figure shows the microcontroller 24 used, here the aforementioned PIC16F1517 by Microchip Technology Inc, with indications of its corresponding inputs and outputs. Part b) of the Figure shows the electrodes J, which here comprise electrodes $J_1$-$J_{17}$ connected in single configuration to respective inputs of the microcontroller 24, as well as electrodes $J_{18}$-$J_{27}$ connected to respective inputs of the microcontroller 24 in common or in parallel to electrode $J_{28}$-$J_{37}$. It should be noted, on the connection between each of the electrodes $J_1$-$J_{27}$ and the corresponding input of the microcontroller 24, the aforementioned filter resistance, which may possibly be omitted. Part c) of FIG. 29 illustrates a possible circuit diagram of a temperature sensor usable in the device according to the invention, such as for example the temperature sensor 26 and/or 27 of FIG. 7, while part d) of the Figure illustrates a possible communication port or electrical connector belonging to the circuit arrangement 23 of FIG. 7, usable for example for programming and/or calibrating the level sensor in the production step. Of course, the circuit arrangement 23 also includes a power supply stage, not shown, as it is producible according to techniques known per se.

Due to its nature of having discrete detecting elements, the sensor according to the invention is able to perform level measurements in a wide range of situations, which occur for example in SCR systems. A first typical situation is that previously described, in which the liquid contained in the tank is entirely in the fluid state. A second situation is that which can occur in the case where the tank is operated under conditions of low temperatures, such as to produce the total freezing of the liquid present in the tank. In this case as well, the sensor 10 is perfectly capable of recognizing the electrodes facing the frozen mass, and thus to calculate its height. A third situation is that in which the tank contains a predominantly liquid part in which frozen parts float or are immersed ("iceberg effect"): in this case as well, the level measurement made by the sensor 10 can occur in the modalities already described above, since the presence of frozen parts does not affect the operation of the sensor 10 or the calculation of the level. Similar considerations apply to the case in which there is a direct transition between liquid and ice.

The sensor 10 is also able to carry out detections in mixed situations, when the liquid-ice system is freezing or thawing. A case of this type is illustrated schematically in FIG. 30, where in the upper part of the tank 1, frozen liquid is present, indicated by I, to form a partial or total "cap"; in the lower part of the tank 1, at a higher temperature, the content L of the tank is already in liquid form and between the solid part I and the liquid part L, air is present, indicated by A, or a vacuum. This condition can arise, for example, in the case of use of the liquid L contained in the tank before it freezes completely or after it has been obtained a partial thawing of the contents of the tank by means of a heater: in this case, an intermediate empty zone or with air between the liquid and the ice essentially corresponds to the part of the liquid used. In accordance with an aspect of the invention, in a condition of this type, it is advantageous to detect the level of the liquid in order to avoid its complete use, i.e., order to leave at least a part of liquid in the tank, for reasons clarified hereinafter.

In a condition of the type exemplified, the control electronics of the sensor 10 is able to correctly identify the presence of one or more electrodes ($J_4$, $J_{20}$) facing the liquid L, followed by the presence of one or more electrodes ($J_{21}$, $J_{37}$) facing the air A, followed in turn by one or more electrodes ($J_{38}$, $J_{n0}$) facing the ice I. Advantageously, in a situation of this type, the control electronics of the sensor according to the invention is able to define both the quantity/level of the liquid content L, important because it is the part directly usable at the time by the SCR system, as well as the total quantity of liquid (L+I) present in the tank, important for planning the refilling of the tank 1. One possible control logic usable for detecting the so-called "igloo effect" (presence of a layer of air covered by a layer of ice) may be the following:

- only all the detecting electrodes that are "dry", i.e., facing the air, are considered;
- the acquired information on a number (e.g. 3) of electrodes successive to a considered dry electrode is evaluated (meaning electrodes successive to the those above the considered dry electrode, in the case of mounting the sensor from below, or below the considered dry electrode, in the case of mounting the sensor from above);
- verifying, if above a "dry" electrode an electrode is present—between the aforesaid successive electrodes—which is facing the liquid; to this end, in a preferred embodiment, the difference can be calculated between the measurements carried out on the said successive electrodes and the considered "dry" electrode, comparing the three individual results with absolute thresholds defined in the design stage: if at least one of these differences coincides with or is within the determined neighborhood of the defined threshold, the presence of the "igloo effect" is determined.

Figure 30:
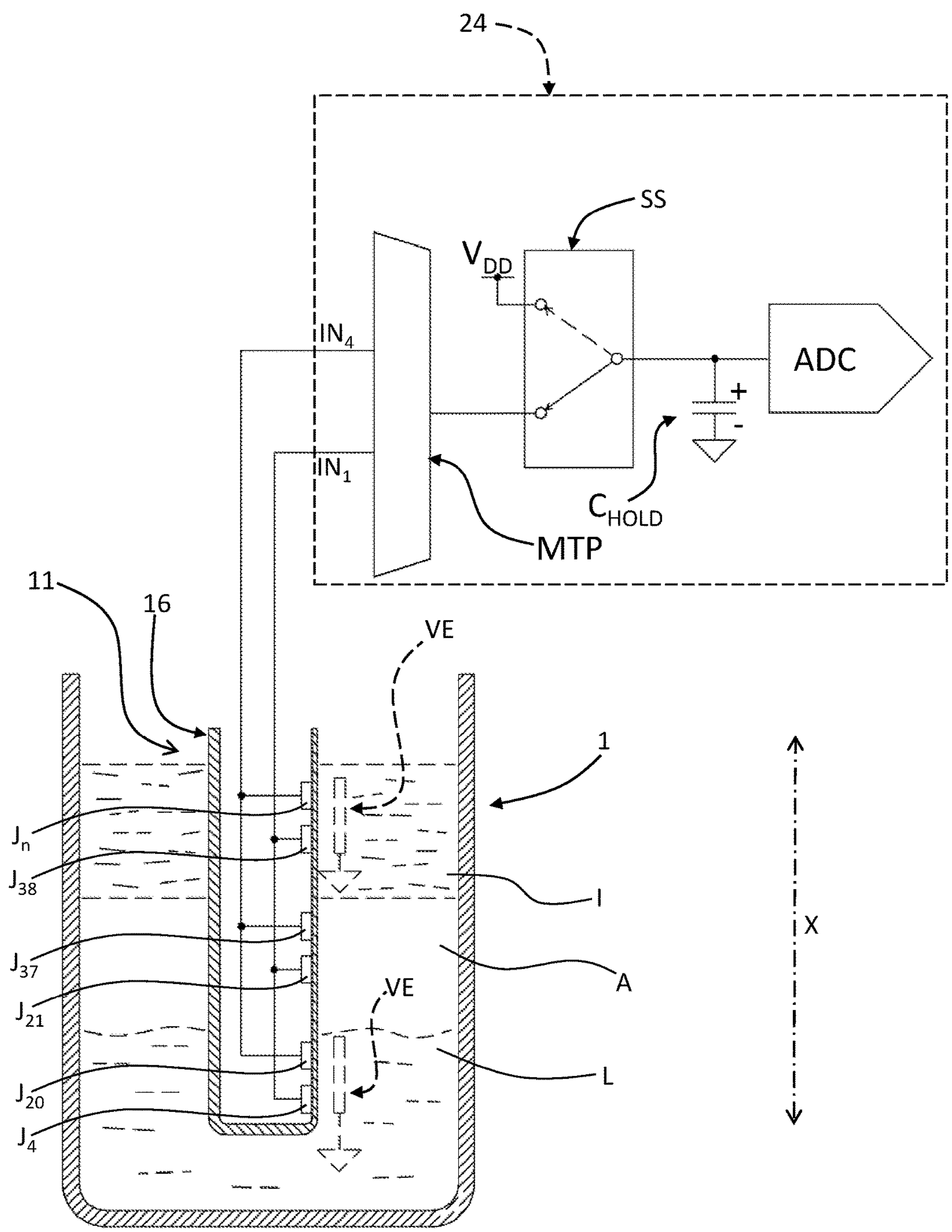
FIG. 30 is a schematic and partial representation similar to that of FIG. 25, designed to exemplify a further possible condition of use of a level sensor in accordance with a possible embodiment of the invention.

It is also possible that, starting from a situation of the type shown in FIG. 30, a refilling of the tank is carried out, thus introducing a part of the liquid L, which could be blocked by the ice cap I still present in the tank 1. According to the principles set out above, in this case as well, the sensor according to the invention is clearly capable of detecting the increase in the total level of liquid present in the tank 1. Again with reference to situations of the type represented in FIG. 30, it will be appreciated that, if required, the electronics of the sensor 10 can be programmed to carry out subsequent detections, spaced apart by a certain period of time (for example 2 minutes), in order to verify the progressive course of the melting of the ice cap I.

As already indicated, the electronics of the sensor subject of the invention is initialized and calibrated during the production stage, with storage of the corresponding software and corresponding variables, including one or more of the reference thresholds dependent on the physical configuration of the sensor—tank system, of which the minimum thresholds are representative of the condition of an electrode or a group of electrodes not facing the fluid. The minimum threshold for the opposite case (liquid facing an electrode) can be predefined in the face of experimentation and/or possibly defined by means of a further test with the sensitive part 11 of the sensor completely immersed in the liquid. In the case in which the sensor 10 provides electrodes in parallel, the intermediate thresholds are then also defined experimentally including the minimum and the maximum threshold.

The temperature information can be acquired via the sensor 27 and/or 26 and can be used by the electronics 23 to recognize the situation of the system tank, for example to deduce the condition of freezing of the liquid and activate a corresponding heater, and/or to mathematically compensate the information on the level measurement, particularly in the case of applications at critical temperatures where the use of a differential measurement with the reference electrode may not be sufficient to ensure the compensation of the error.

It should be noted that, in order to cause melting, by means of a heater, of some frozen liquids, such as the additive AdBlue considered here, it is anyway necessary that a part of melted liquid is present in the tank, so that the heater can continue to heat the liquid and transmit the heat to the frozen mass. In the application to a SCR system, when the vehicle engine is started, there occurs a withdrawal of the additive, and this is not particularly problematic, as long as a certain amount of heated additive still remains in the tank, which can reach the frozen mass by virtue of the movement of the vehicle and the consequent agitation of the hot liquid in the tank 1. If, conversely, the initial withdrawal of the additive determines the emptying of the entire residual liquid of the tank contents, the melting effect is halted. For this reason, in a preferred embodiment, the sensor according to the invention can be arranged, for example at the software level, to detect the level of the melted liquid, so as to guarantee the presence of a minimum level, sufficient for the melting effect not to be halted; to this end, the sensor 10 can generate a suitable signal or data outwards, for example, usable by the electronics of the vehicle and/or for relevant warnings.

It will be appreciated, of course, that with the sensor subject of the invention the progressive melting of the frozen mass of liquid is also easily detectable, as the melting gradually proceeds. The sensor 10 is, of course, able to operate during heating and/or thawing of the liquid or other means subject to level detection, as well as in the course of its possible freezing.

The sensor 10 is interfaced with an external control system, such as a control unit of the SCR system by means of the connector 12*b*. For this purpose, the control electronics 23 of the sensor is arranged for the transmission of data, preferably in a serial format, most preferably by means of an interface and/or a SENT (Single Edge Nibble Transmission) protocol. The signals sent can also comprise, in addition to information representative of the level of the medium subject to detection, information representative of at least one of the temperature of the medium or the air present in the tank, the presence of the freezing or solidification condition of at least part of the medium subject to detection, the presence of a condition of abnormal function, a warning and/or status signal.

From the above disclosure it is deduced how the operation of the level sensor described is essentially independent from the dielectric constant of the medium being measured. The sensitive element represented by the array of electrodes is able to carry out the level measurement even if completely isolated from the liquid, thereby guaranteeing its protection from contact with aggressive liquids, such as AdBlue or urea, and conferring a good mechanical robustness to the structure of the sensor. In this perspective, the thickness of the wall of the casing 16, in particular in the area facing the electrodes J, can be indicatively comprised between 0.1 and 5 mm, preferably between 0.6 and 1 mm, even more preferably of about 0.8 mm; as already mentioned, the casing can be replaced by a direct over-molding of plastic material on the sensitive element, or by a generic insulation wall of the electrodes J, with similar thickness to that indicated.

The sensor described can be any length and is therefore easily adaptable within any vessel. A problem present in the application of the level sensors is exactly that represented by the length of the sensor, or the height of the level that is to be measured, which is a variable dependent on the installation tank. In this context, the invention allows

- the use of standardized electronics, or a minimum possible number of components, with a microcontroller that, for the same or nearly the same number of inputs, can handle a large series of lengths due to the possible connection in common or in parallel of multiple sub-arrays of electrodes;
- the use of a highly flexible circuit design for the various possible lengths required for the sensor, or rather to keep the same microcontroller with the same number of inputs even for level sensors of different lengths. As already mentioned, for example by placing 20 electrodes of 2 mm in height at a distance of 2 mm from each other, a sensitive area of 78 mm for measuring the length is achieved, or 78 mm of a sensitive area for a group of first electrodes; when it is necessary to increase the length of the sensitive area, it is possible to use the same number of inputs by providing second electrodes in parallel to the first: it is thereby possible to maintain the same microcontroller, both for reasons of cost and in terms of project. By way of non-limiting example, it is theoretically possible to reach lengths close to 780 mm, with ten sub-arrays of electrodes. For such long lengths it is, moreover, possible to reduce the number of sub-arrays of electrodes, in the case where a lower sensitivity or resolution of measurement is acceptable, at least in certain parts or levels of the sensor: to this end, as already mentioned, it is possible, for example, to increase the distance between the electrodes in areas where the measurement accuracy is less significant (such as a level close to the full tank) and to instead decrease this distance to have greater resolution in areas considered more critical (for example, close to a minimum level in the tank).

In various embodiments previously described, a mounting of the sensor 10 on the lower wall of the tank has been assumed, so that the electrode indicated by $J_1$ represents the lowest electrode within the tank itself. Obviously, as explained, the mounting of the sensor can also take place at the upper wall of the tank, in which case—referring to the illustrated examples—the electrode $J_1$ will be that next to the distal end of the portion 20*b* of the support 20 and the electrode J will be that next to the proximal end of said portion 20*b*: of course, the control software will be arranged in order to allow the level detection according to the installation point of the sensor, as a further advantage of the flexibility of use.

From the above description, the characteristics of the present invention are clear, as are its advantages, mainly represented by the simplicity of producing the level sensor proposed, from its low cost, its precision and reliability, and its high flexibility of use and configuration.

It is clear to the skilled person that numerous variants are possible of devices and methods described as an example, without thereby departing from the scope of the invention as defined by the attached claims.

Figure 31:
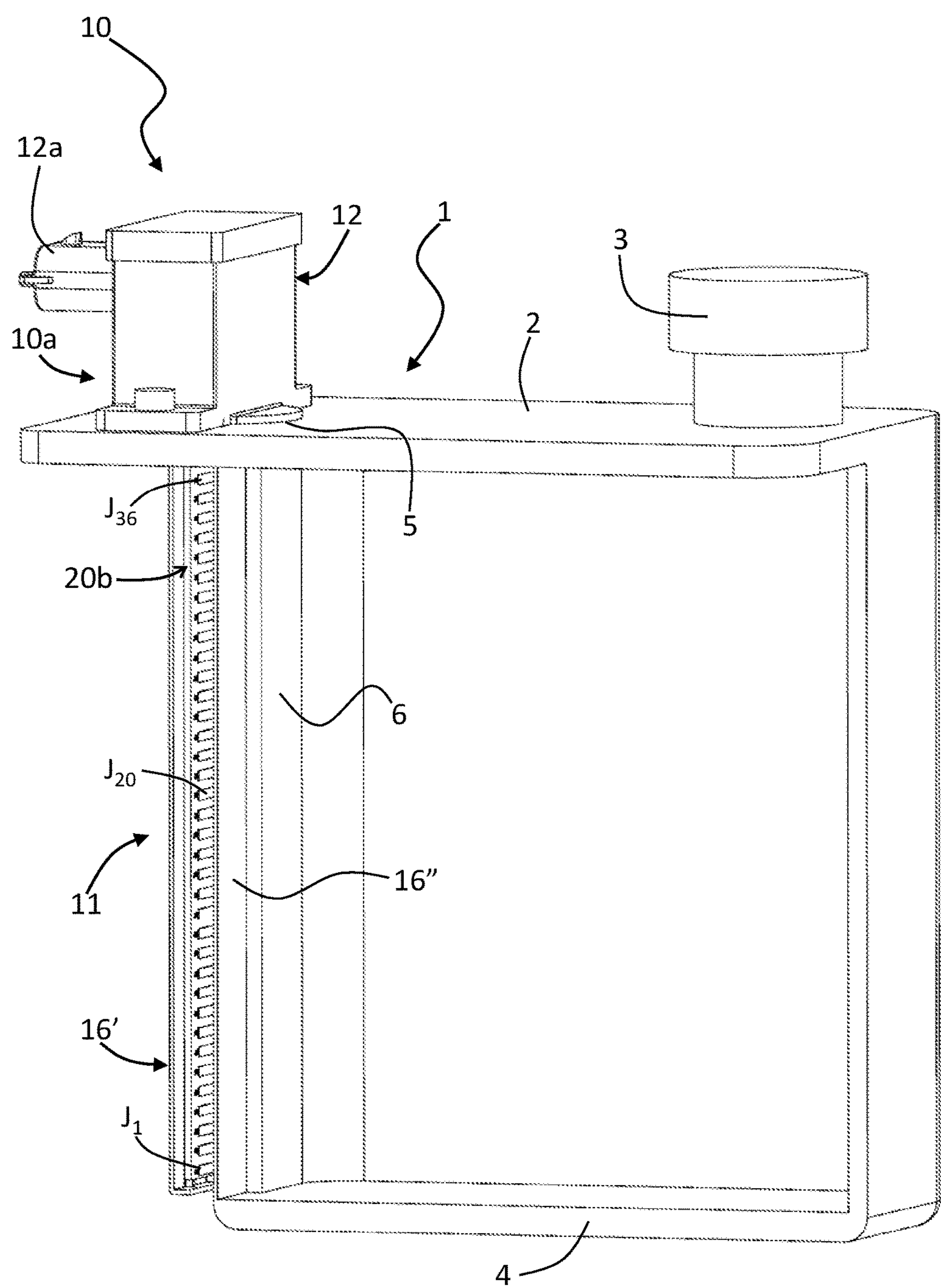
FIG. 31 is a partially sectioned, schematic perspective view of a possible embodiment variant of a level sensor according to the invention.

According to possible variants of embodiments or applications, the level sensor subject of the invention can be arranged outside the vessel or tank containing the medium subject to detection (i.e. at an outer wall or in a seat formed at this outer wall of the vessel or tank), with the array of electrodes J leaning against a wall of this vessel, with the possible interposition of the gel G or the like. In this case, the aforesaid wall of the vessel is suitably configured in terms of material and thickness, in order to achieve the layer that electrically insulates the electrodes J with respect to the inside of the vessel 1. A possible embodiment is illustrated in FIG. 31, in which the casing of the sensor body 10*a* is here a laterally open casing 16', so that the front of the portion 20*b* of the support, and therefore the electrodes J are facing and/or placed against a respective portion 16" of a side wall 6 of the tank 1; in the example, this portion 16", which here creates the insulation layer that electrically isolate the electrodes J with respect to the inside of the tank 1, is narrowed with respect to the rest of the wall 6, for example with a thickness between the already mentioned 0.1 and 5 mm.

According to other variant embodiments, the casing 16 and at least part of the corresponding characteristics previously described may be included in at least one part integrated or associated with the vessel or tank. As already mentioned, the electrodes could be associated directly with a wall or wall portion of the tank (for example the portion 16" of FIG. 31), which in this case would constitute both the substrate for the electrodes J and the layer of isolation with respect to the contents of the tank.

The invention has been described with particular reference to detecting the level of a liquid medium, particularly a urea-based additive, but as already mentioned the sensor described is capable of being used in combination with different substances and materials, also potentially subject to solidification for reasons other than freezing (for example a mass of a powdered material or the like, in which a part is compacted or solidified, for example due to excessive humidity).

The invention claimed is:

1. A level sensor for detecting the level of a medium contained in a vessel, the sensor comprising

- an array of capacitive elements designed to be associated with the vessel, in particular to extend according to an axis of detection of the level of the medium, the array of capacitive elements comprising a plurality of electrodes, in particular on a face of an electrically insulating substrate having a generally elongated shape, the electrodes being spaced apart from each other, in particular along the axis of detection, and being essentially coplanar to each other,
- at least one insulation layer for electrically insulating the electrodes with respect to the inside of the vessel,
- a controller having a plurality of inputs,
- wherein each capacitive element comprises a group of electrodes connected in common to each other, particularly in parallel, the group of electrodes being connected to a respective input of the plurality of inputs,
- and wherein the controller is prearranged for discriminating a value of electrical capacitance associated with each electrode to deduce the level of the medium present in the vessel,
- wherein the electrodes of respective groups form, on the insulating substrate, respective sub-arrays of electrodes arranged in a sequence along the axis of detection,
- and wherein, given a number y of first electrodes connected in parallel to second electrodes, between each first electrode and the corresponding second electrode, y−1 electrodes are interposed.

2. The level sensor according to claim 1, wherein each capacitive element consists of a group of electrodes connected in common to each other, particularly in parallel, in such a way that each group of electrodes realizes an armature of a virtual capacitor, whose other armature is realized by the medium contained in the vessel and wherein the insulation layer realizes the dielectric between the armatures of the aforesaid virtual capacitor, and wherein the controller is prearranged for carrying out a sequential sampling of the values of electrical capacitance present at the inputs and discriminating thereby a value of electrical capacitance associated to each electrode for deducing the level of the medium present in the vessel.

3. The level sensor according to claim 2, wherein with each input of the plurality of inputs a circuit, including a controllable switch and a capacitor, is operatively associated, the controllable switch being switchable between a first position, in which the capacitor is connected to a voltage source, and a second position, in which the capacitor is connected to the respective group of electrodes, and the controller is configured for switching the switch from the first position to the second position, in order to discharge the capacitor in a manner proportional to the value of electrical capacitance associated with the corresponding group of electrodes.

4. The level sensor according to claim 3, wherein the voltage determined at said input is a differential voltage, the measuring circuit being prearranged for calculating the difference between the voltage value detected at said input and the voltage value detected at an input of the plurality of inputs, which is connected to at least one reference electrode, and the comparator circuit is prearranged to compare the voltage differential value with said reference threshold or with each of said reference thresholds.

5. The level sensor according to claim 1, wherein each electrode is capable of attaining at least a first capacitive configuration or structure having a first value of electrical capacitance when the electrode faces the medium, or when the level of the medium in the vessel is at or above the electrode, and a second capacitive configuration or structure having a second value of electrical capacitance when the electrode does not face the medium, or when the level of the medium in the vessel is below the electrode.

6. The level sensor according to claim 1, wherein the controller is prearranged for discriminating the value of electrical capacitance associated with each electrode from at least one first and one second value of electrical capacitance, to identify a transition between the medium and air or gas in the vessel, which represents the level of the medium.

7. The level sensor according to claim 1, wherein with each input of the plurality of inputs a circuit, including a controllable switch and a capacitor, is operatively associated, the controllable switch being switchable between a first position, in which the capacitor is connected to a voltage source, and a second position, in which the capacitor is connected to the respective group of electrodes, and the controller is configured for switching the switch from the first position to the second position, in order to discharge the capacitor in a manner proportional to the value of electrical capacitance associated with the corresponding group of electrodes.

8. The level sensor according to claim 7, wherein the controller has:

a measuring circuit, to determine a voltage at said input with the switch in the second position, and a comparator circuit, to compare the voltage determined at said input with at least one corresponding reference threshold, to deduce if the medium faces or does not face an electrode of the group of electrodes.

9. The level sensor according to claim 8, wherein the reference thresholds are of a number corresponding to the number of electrodes of one said group increased by one, or else of a number corresponding to the number of electrodes of one said group, and the comparator circuit is prearranged to compare the voltage determined at said input with each of the reference thresholds, to deduce if each one of the electrodes of the said group faces or does not face the medium.

10. The level sensor according to claim 8, wherein each group of electrodes comprises at least one first electrode and one second electrode connected in parallel to each other, and the comparator circuit is prearranged to compare the voltage determined at said input with at least two corresponding reference thresholds, in order to deduce if the medium faces or does not face the first electrode and/or the second electrode.

11. The level sensor according to claim 1, wherein at least one portion of an electrically insulating substrate leans against the insulation layer at a face thereof provided with the plurality of electrodes.

12. The level sensor according to claim 1, wherein between the insulation layer and the face of an electrically insulating substrate bearing the plurality of electrodes, a filling material is present, the filling material being arranged between the insulation layer and said face and/or a front of the electrodes.

13. The level sensor according to claim 1, wherein the array of capacitive elements is contained in a casing which is electrically insulating and fluid-tight, defining said at least one insulation layer and configured to be arranged within the vessel according to the axis of detection, the casing being a casing defining a respective cavity for inserting the electrically insulating substrate bearing the electrodes or else being a casing molded over at least one part of the electrically insulating substrate bearing the electrodes.

14. The level sensor according to claim 1, comprising at least one of:

a sensor body defining a connecting portion configured for sealed coupling at a respective mounting opening of the vessel;

a sensor body at least partially formed with a moldable thermoplastic material, a sensor body defining a cavity for receiving an electrically insulating substrate, the cavity having elements for guiding and/or positioning the substrate;

a sensor body having a connector with electrical terminals, wherein an electrically insulating substrate has electrical contacts configured for elastic coupling or insertion with the terminals of the connector;

a sensor body having positioning elements configured to push at least one portion of an electrically insulating material bearing the electrodes towards the insulation layer;

a sensor body having a coupling arrangement prearranged for quick coupling to a wall of the vessel;

a sensor body having a distal end prearranged for releasable coupling with a wall of the vessel.

15. The level sensor according to claim 1, wherein the electrically insulating substrate has a first portion bearing the plurality of electrodes and a second portion bearing a circuit arrangement including the controller, on the substrate there being provided electrically conductive tracks for electrical connection of the electrodes, and/or has at least one temperature sensor associated therewith, and/or has a distal end which is spaced apart from a distal end of a corresponding casing, particularly for compensating possible expansions, and/or has at least one reference electrode associated therewith, in at least one of a distal end portion thereof and a proximal end portion thereof, and/or has a plurality of reference electrodes associated therewith, such as at least two reference electrodes each at a respective end of an array of the plurality of electrodes, or else the reference electrodes are interposed with sub-arrays of detecting electrodes, and/or has a plurality of reference electrodes associated therewith, each connected to a respective input of the controller or else at least some of which are connected in parallel to the one and the same input of the controller, and/or has first electrodes of the plurality of electrodes, which are closer to each other in the direction of an axis of detection compared to second electrodes of the plurality of electrodes, the first electrodes determining a higher resolution of level measurement than the one determined by the second electrodes.

16. The level sensor according to claim 1, wherein the controller is prearranged for detecting one or more of the following conditions:

the medium contained in the vessel is entirely in the fluid state;

the medium contained in the vessel has entirely passed from a fluid state to a solid or frozen state;

the medium contained in the vessel has a predominant fluid part wherein there are floating or submerged parts of the medium which are in the solid or frozen state;

the medium contained in the vessel is in the phase of passage from a fluid state to a solid state or vice-versa, such as freezing or thawing;

the medium contained in the vessel includes at least one part in a solid or frozen state and a second part in a fluid or liquid state, with a layer of air or gas being interposed between the first part and the second part;

the medium contained in the vessel comprises at least one part in a solid or frozen state, with a part above in a fluid or liquid state.

17. A method to control a level sensor of a medium contained in a vessel, the sensor having a plurality of electrodes arranged according to an array that extends according to an axis of detection of the level of the medium, comprising the steps of:

i) acquiring electrical signals by means of first electrodes, which do not face the medium;

ii) acquiring electrical signals by means of a number of second electrodes, which are above a first considered electrode;

iii) verifying if, above the first considered electrode, at least one electrode that faces the medium is present, among the aforesaid second electrodes, and deducing thereby that the medium contained in the vessel comprises at least one part in the solid or frozen state, which is above a layer of air or gas, wherein step iii) comprises calculating the difference between the values of electrical signals acquired by means of said second electrodes and the value of the electrical signal acquired by means of the first considered electrode, and comparing the single results with at least one defined threshold, and if at least one of the differences coincides with or is in within a determined neighborhood of the defined threshold, deducing that the medium contained in the vessel comprises at least one part in the solid or frozen state, which is above a layer of air or gas.

18. A vessel, prearranged for coupling with a level sensor according to claim 1.

19. A level sensor for detecting the level of a medium contained in a vessel, the sensor comprising an array of capacitive elements designed to be associated with the vessel, to extend according to an axis of detection of the level of the medium, the array of capacitive elements comprising a plurality of electrodes on a face of an electrically insulating substrate having a generally elongated shape, the electrodes being spaced apart from each other along the axis of detection and being essentially coplanar to each other, at least one insulation layer for electrically insulating the electrodes with respect to the inside of the vessel, a controller having a plurality of inputs, wherein each capacitive element comprises at least one of a single electrode and a group of electrodes connected in common to each other, particularly in parallel, the single electrode or the group of electrodes being connected to a respective input of the plurality of inputs, wherein the controller is prearranged for discriminating a value of electrical capacitance associated with each electrode to deduce the level of the medium present in the vessel, wherein between the insulation layer and the face of the electrically insulating substrate bearing the plurality of electrodes a filling material is present, the filling material being arranged between the insulation layer and said face and/or a front of the electrodes.

20. A level sensor for detecting the level of a medium contained in a vessel, the sensor comprising an array of capacitive elements designed to be associated with the vessel, to extend according to an axis of detection of the level of the medium, the array of capacitive elements comprising a plurality of electrodes on a face of an electrically insulating substrate having a generally elongated shape, the electrodes being spaced apart from each other along the axis of detection and being essentially coplanar to each other, at least one insulation layer for electrically insulating the electrodes with respect to the inside of the vessel, a controller having a plurality of inputs, wherein each capacitive element comprises at least one of a single electrode and a group of electrodes connected in common to each other, particularly in parallel, the single electrode or the group of electrodes being connected to a respective input of the plurality of inputs, wherein the controller is prearranged for discriminating a value of electrical capacitance associated with each electrode to deduce the level of the medium present in the vessel, wherein the level sensor comprises a sensor body having positioning elements configured to push at least one portion of the electrically insulating material bearing the electrodes towards the insulation layer, the positioning elements being elastically yieldable and/or deformable.

* * * * *